March 31, 1953     J. ZABA     2,633,086
GAS LIFT SYSTEM AND APPARATUS THEREFOR
Filed June 19, 1947     7 Sheets-Sheet 1
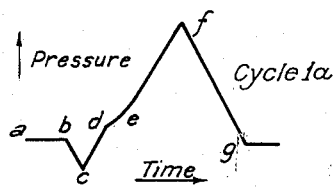
Fig. 3
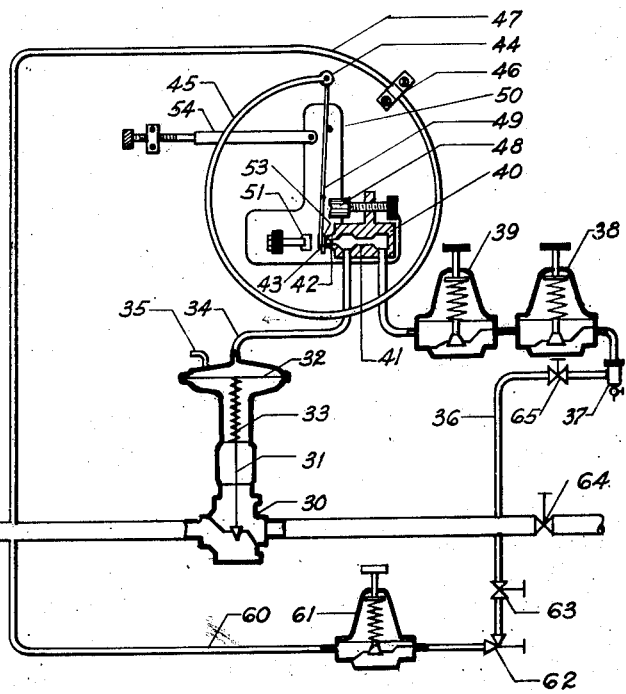
Fig. 1
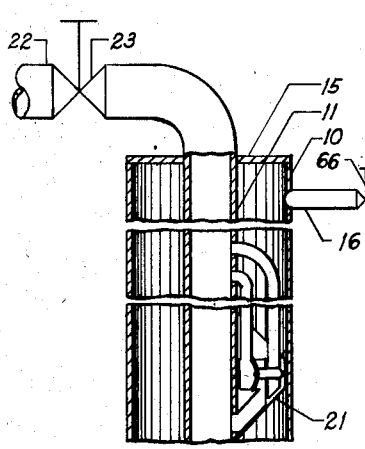
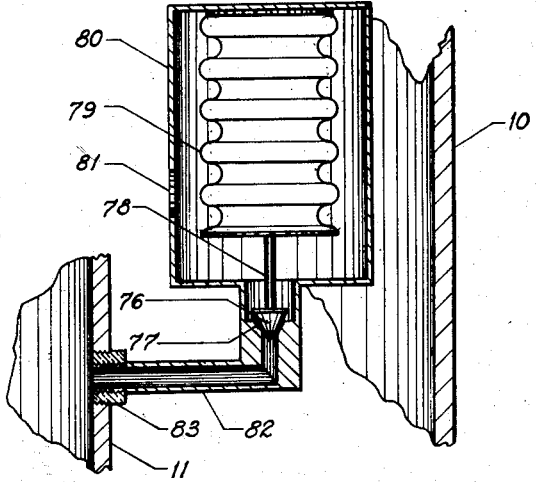
Fig. 2
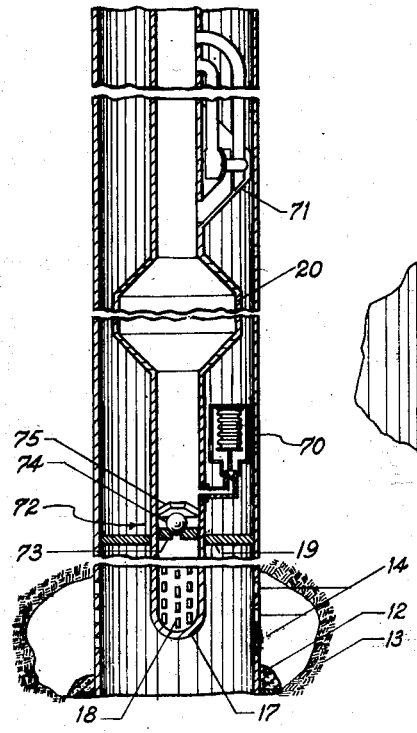
Joseph Zaba
INVENTOR.
BY Murray Robinson
ATTORNEY March 31, 1953  J. ZABA  2,633,086
GAS LIFT SYSTEM AND APPARATUS THEREFOR
Filed June 19, 1947  7 Sheets-Sheet 2
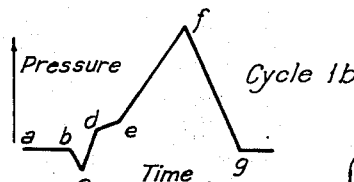
Fig. 6
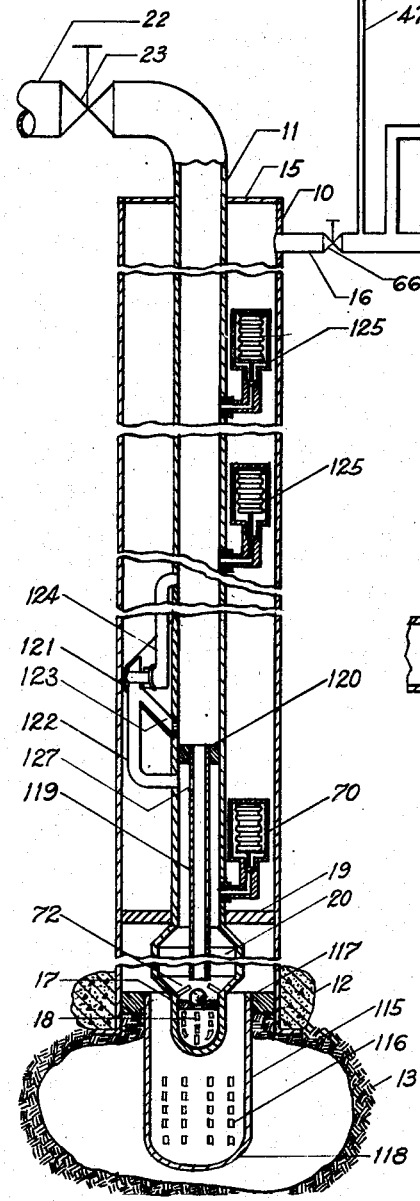
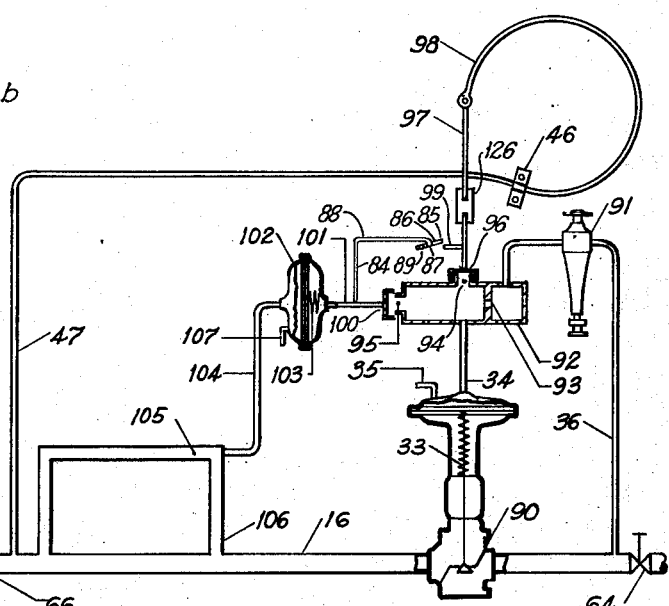
Fig. 4
Fig. 5
Joseph Zaba
INVENTOR.
BY Murray Robinson
ATTORNEY March 31, 1953  J. ZABA  2,633,086

GAS LIFT SYSTEM AND APPARATUS THEREFOR

Filed June 19, 1947  7 Sheets-Sheet 3

Joseph Zaba
INVENTOR.

BY Murray Robinson
ATTORNEY

March 31, 1953 — J. ZABA — 2,633,086
GAS LIFT SYSTEM AND APPARATUS THEREFOR
Filed June 19, 1947 — 7 Sheets-Sheet 4
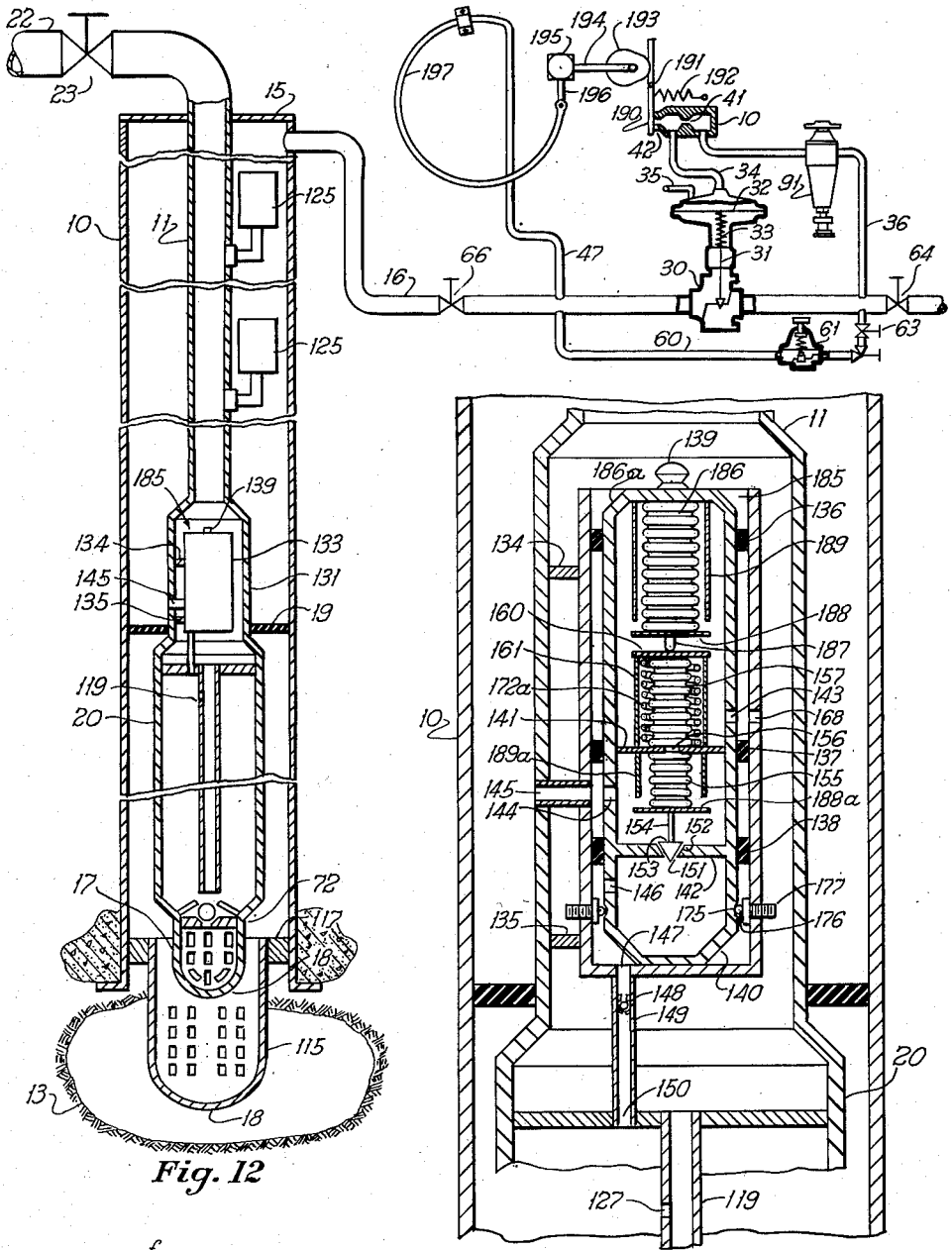
Fig. 12
Fig. 13
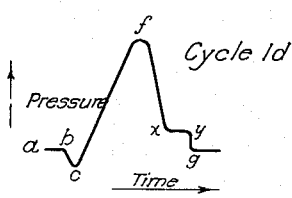
Fig. 14
Joseph Zaba
INVENTOR.
BY Murray Robinson
ATTORNEY March 31, 1953     J. ZABA     2,633,086
GAS LIFT SYSTEM AND APPARATUS THEREFOR
Filed June 19, 1947     7 Sheets-Sheet 5
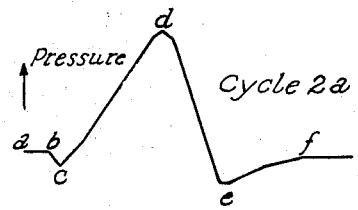
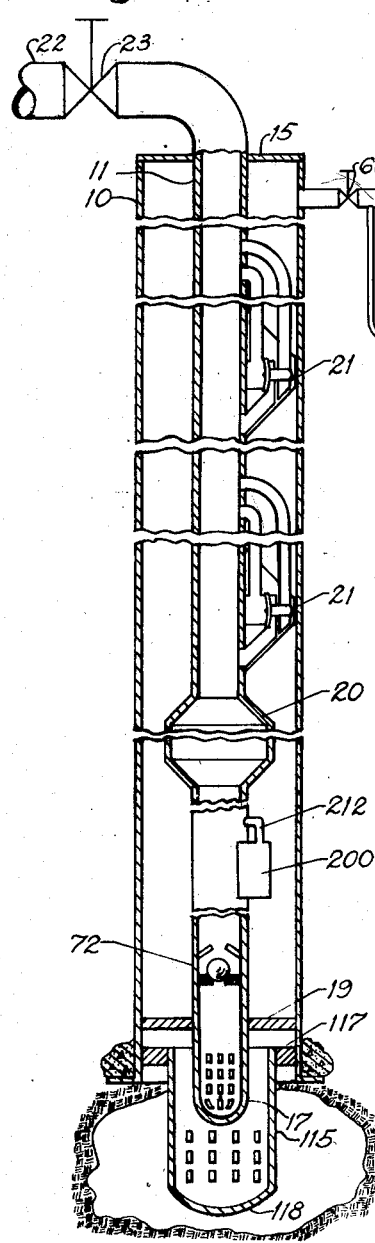
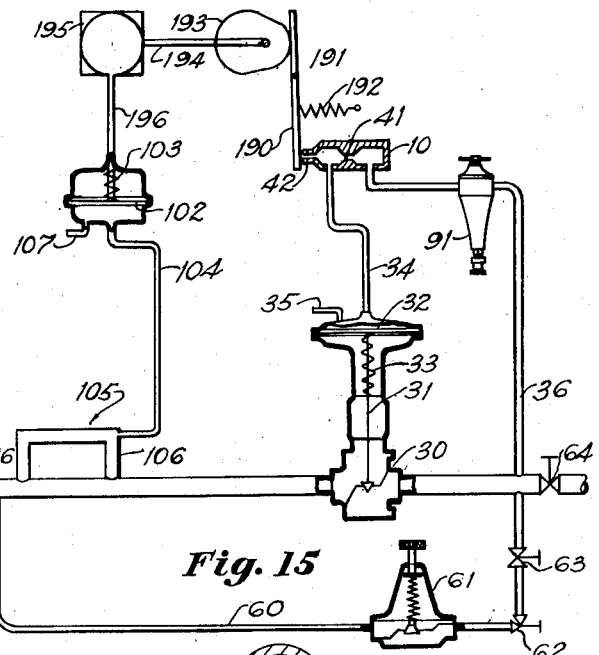
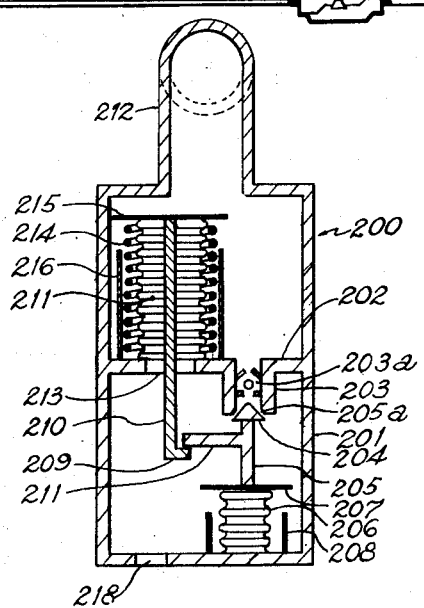
Joseph Zaba
INVENTOR.
BY Murray Robinson
ATTORNEY March 31, 1953  J. ZABA  2,633,086
GAS LIFT SYSTEM AND APPARATUS THEREFOR
Filed June 19, 1947  7 Sheets-Sheet 6
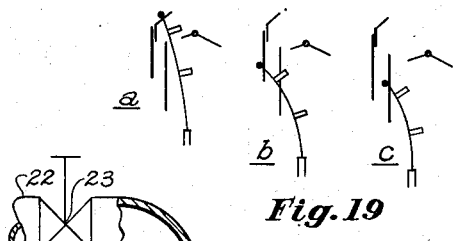
Fig. 19
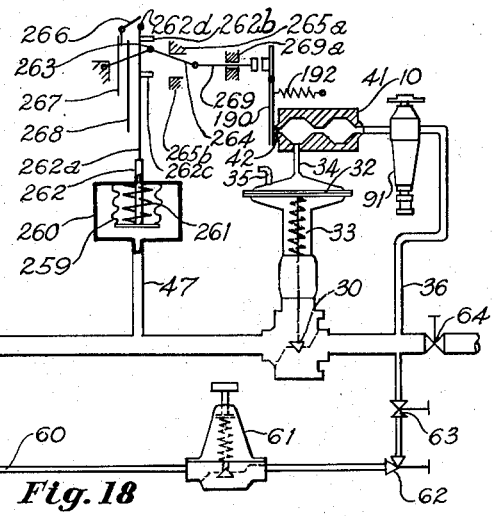
Fig. 18
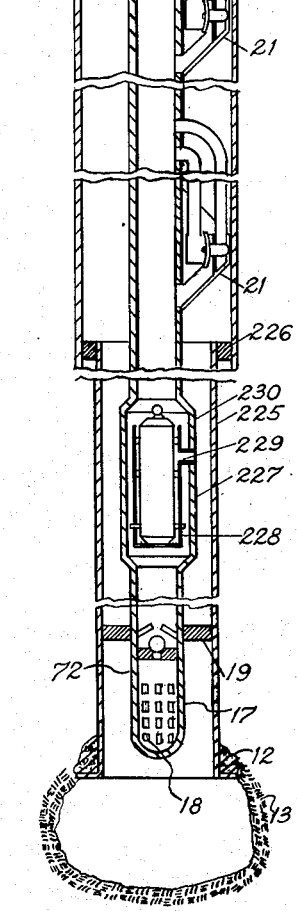
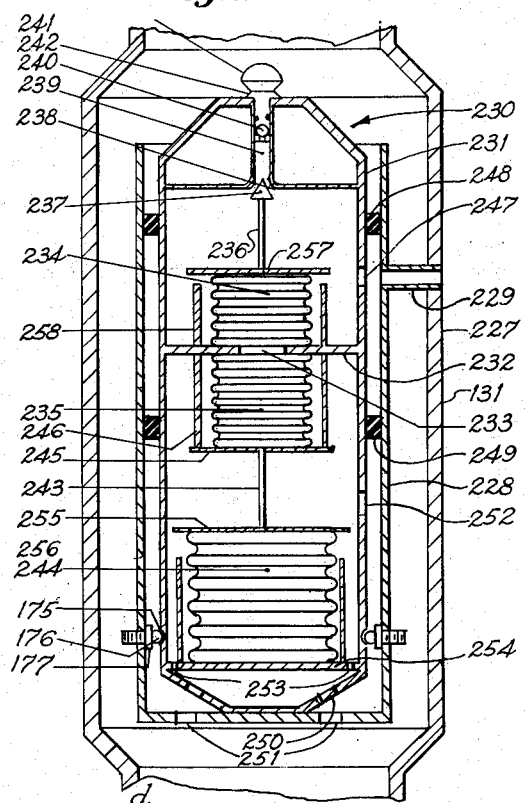
Fig. 20
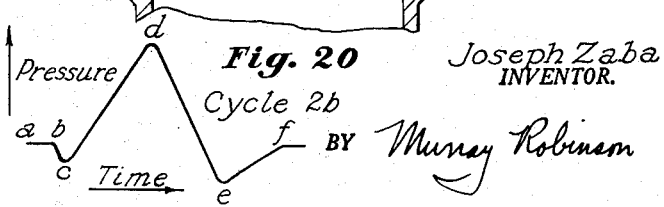
Fig. 21
Joseph Zaba
INVENTOR.
BY Murray Robinson
ATTORNEY March 31, 1953     J. ZABA     2,633,086
GAS LIFT SYSTEM AND APPARATUS THEREFOR
Filed June 19, 1947     7 Sheets-Sheet 7
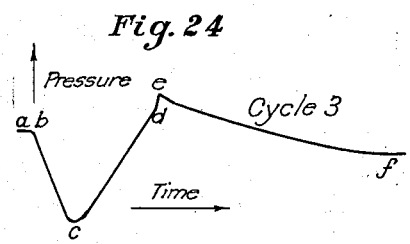
Fig. 24
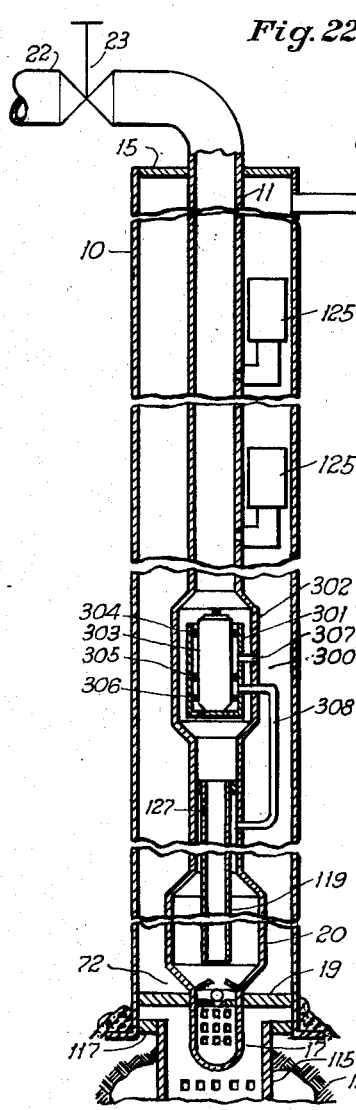
Fig. 22
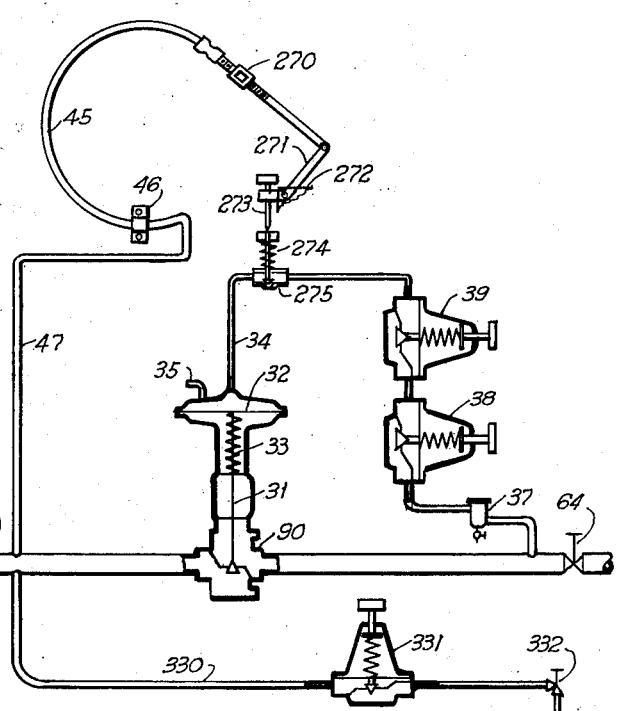
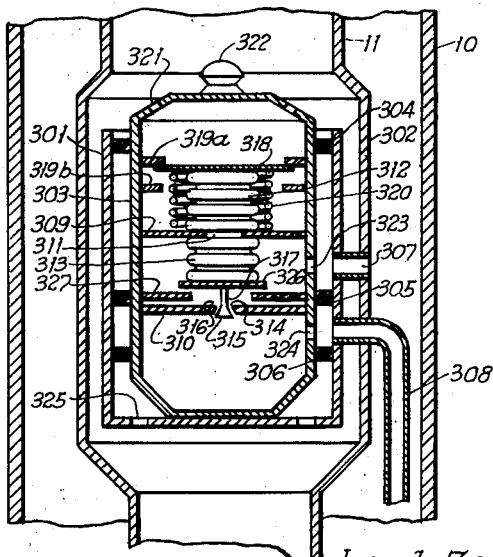
Fig. 23
Joseph Zaba
INVENTOR.
BY Murray Robinson
ATTORNEY Patented Mar. 31, 1953

2,633,086

UNITED STATES PATENT OFFICE 2,633,086

GAS LIFT SYSTEM AND APPARATUS THEREFOR

Joseph Zaba, Houston, Tex., assignor to McEvoy Company, Houston, Tex., a corporation of Texas Application June 19, 1947, Serial No. 755,603

47 Claims. (Cl. 103—231)

This invention pertains primarily to gas lifts for raising petroleum fluids from a well and more particularly to intermittently operating gas lifts in which the oil is lifted in slugs with the gas acting behind the slug as against a piston, which mode of operation is to be distinguished from that of the type of gas lift which operates by aerating the oil, although portions of the invention are applicable to gas lifts generally. Some of the novel elements of the invention are not limited to the field of gas lifts but are of general application including such broad fields as that of regulating devices.

The principal object of the invention is to improve the efficiency of operation of gas lifts so as to obtain maximum production.

A further object of the invention is to reduce the quantity of gas needed to obtain a given rate of production.

Another object of the invention is to improve the gas-oil ratio and maintain it substantially constant.

Still another object of the invention is to make the quantity of gas used adjustable from the surface of the ground.

Yet another object of the invention is to reduce to a minimum the number of pieces of bottom hole equipment needed for a gas lift and to simplify the construction thereof.

Another object of the invention is to make it possible to remove the bottom hole equipment of the particular gas lift according to the invention without the necessity of pulling the tubing.

Another object of the invention is to simplify the construction of the surface controls and to eliminate the necessity for a clock mechanism.

A further object of the invention is to simplify the over all construction of the gas lift apparatus particularly by eliminating the need for any macaroni strings, wire lines, reciprocable tubing or other cumbersome equipment for operating the subsurface valve mechanism from the surface.

Another object of the invention is to provide a single type of gas lift that is adaptable to all types of wells—high and low productivity and high and low pressure.

Another object of the invention is to provide a gas lift that is strong and durable and will not require frequent repair even in wells producing large proportions of salt water, sand, and other corrosive and abrasive substances along with the petroleum fluids.

By way of introduction it may be said that a typical embodiment of the invention comprises a valve mechanism or means at the botom of the hole which is controlled by a well fluid responsive device to open communication between the tubing and the casing annulus when a predetermined quantity of fluid has accumulated and a valve mechanism or means at the surface of the ground which is controlled in response to the changed condition of the gas in the annulus produced by opening of the bottom hole valve mechanism to open communication between the gas supply and the annulus after the subsurface valve mechanism has opened and to close communication therebetween after a predetermined quantity of gas has been admitted to the annulus sufficient to make up the amount needed to raise the well fluid to the surface, the subsurface valve mechanism acting in response to changes in pressure of the gas in the annulus to close communication between the casing annulus and tubing at a time prior to the expulsion of the well fluid from the tubing when there is sufficient gas beneath the well fluid to lift it to the surface by expansion of the gas.

The principal advantages of the invention as just set forth lie in the fact that the gas is not admitted to the well fluid until exactly the predetermined amount of fluid has accumulated so that proper submergence will be had and so that the amount of fluid will not be too great for the gas to lift, while at the same time the gas supply to the well fluid is cut off prior to complete expulsion of the well fluid at just the right time so that no more gas is used than is needed, the amount of gas admitted being adjustable from the surface so that the exact quantity can be determined by trial after the apparatus has been installed.

The chief problem involved in the attainment of the stated objects lies in the construction of a subsurface valve mechanism that will open in response to the accumulation of the desired quantity of well fluid and yet will close before the well fluid has been expelled. Prior systems are known utilizing well fluid responsive valves to admit gas to the well fluid to raise the well fluid but these have been unsatisfactory because admission of gas to the well fluid maintains the pressure in the passage containing the well fluid at the point where the well fluid responsive valve is located even after the well fluid has left the valve so that the valve remains open the same as if well fluid were there until the well fluid is expelled at the top of the well, letting the gas pressure drop. With such systems the gas-oil ratio is not adjustable and is fixed at an uneconomical point.

Other prior systems are known in which the subsurface valves are controlled from the surface so that the flow of gas to the well fluid eduction passage can be cut off at any time. In these systems it is possible to close the subsurface valves at a predetermined time when enough gas has been admitted to the well fluid so that expansion of the gas will ultimately lift the well fluid to the surface, thereby avoiding waste of gas. However, in these systems the subsurface valve mechanisms are not automatically operated to admit gas to the well fluid when a predetermined quantity has accumulated. The operator of the system must estimate when such quantity of fluid probably will have accumulated, based on previous experience. Such estimate is but an approximation which may differ radically from the actual fact, especially when the rate of accumulation of well fluid is quite variable. With systems of this type the gas-oil ratio cannot be set at any fixed but is free to vary, dependent upon the productivity of the well.

By means of the invention the advantages of both the prior known systems just described are obtained without the attendant disadvantages of either. The key to the problem lies primarily in the provision of a subsurface valve means or mechanism having a principal means for controlling communication through a passage between the gas induction passage and the well fluid eduction passage, one means responsive over a limited range to conditions in the well fluid eduction passage for operating the principal means to open communication between the two passages, and another means responsive to conditions in the gas induction passage for operating the principal means to close communication between the two passages, the means responsive to conditions in the induction passage being capable of operating the principal means to closed position independently of the position of the means responsive to conditions in the eduction passage, the limited range of response of the means responsive to conditions in the eduction tube preventing it from blocking operation of the means responsive to conditions in the gas induction passage which might otherwise occur due to the effect on conditions in the eduction passage produced by changes in conditions in the induction passage when communication is open between the two passages.

In one form of the invention two valves actuated by separate control devices are used for the subsurface valve mechanism, one valve operating as a pilot valve responsive to the well fluid to cause changes in gas pressure to open the main subsurface gas valve which is later closed by gas pressure changes caused by operation of the surface valve mechanism. Since both valves operate each time a load is carried to the surface, they are subject to wear and after having been in use for some time may have to be repaired or replaced. For this reason it is desirable that the subsurface valve mechanism be removable without pulling the tubing. While it is possible to make both the valves of the two valve system removable it is much less difficult to make a single valve removable. Accordingly, in another form of the invention but a single valve is used provided with two control means, one responsive to conditions in the well fluid eduction passage and the other responsive to conditions in the gas induction passage.

It is one of the objects of the invention to simplify the construction of a single valve dual control device of the type just described. This has been achieved by means of a novel element hereinafter referred to as a double bellows. Briefly, the double bellows valve construction comprises two sealed bellows placed with their interiors in communication with each other and having gas at a predetermined pressure inside with the exterior of one bellows exposed to one force and the exterior of the other exposed to another force, and a valve connected to one of the bellows. Changes in the force acting on the bellows connected to the valve will operate the valve directly, while changes in the force acting on the other bellows will indirectly operate the valve by changing the volume of the combined space inside the two bellows, thereby changing the gas pressure and causing the bellows connected to the valve to move to operate the valve. Instead of filling the interior of the bellows with gas, other elastic means of low force-deformation ratio such as a helical spring or a piece of resilient rubber could be placed inside the two bellows between their end walls so as to transmit force non-positively from one to the other. While this double bellows construction is peculiarly suited to the purpose of operating an intermitter valve for a gas lift it can also be used for other purposes and in other fields wherever it is desired to have a device positively responsive to one force and non-positively responsive to another. The thing to be operated need not be a valve but could be any member which it is desired to move.

Returning to consideration of the system of the invention as a whole, three principal forms of the invention will be described, classified according to the cycle of operation as indicated by changes in the gas pressure in the gas induction passage. In the first form of the system, initial operation of the subsurface gas valve mechanism in response to accumulation of the predetermined quantity of well fluid opens communication through a passage between the gas induction and fluid eduction passages causing a change in the condition of the gas in the gas induction passage. This change of condition of the gas, for example a drop in the static pressure or an increase in the rate of flow (kinetic change) actuates the surface valve mechanism to open communication through a passage between the source of gas under pressure and the gas induction passage which causes the gas pressure in the gas induction passage to rise, the rate of admission of gas at the surface being greater than the rate of exhaust at the bottom. The gas pressure continues to rise until after a predetermined quantity of gas has been admitted the surface valve mechanism closes. At the moment of closing of the surface valve mechanism the gas pressure in the gas induction line will be considerably higher than the pressure at the beginning of the cycle. The gas pressure will then start to fall again and will continue to fall until the starting pressure is reached, at which point the subsurface valve mechanism closes, thus completing the cycle.

A second form of the system operates on a cycle similar to the first cycle except that at the end of the cycle the gas pressure must drop below the starting pressure to close the subsurface valve mechanism. The surface valve mechanism is always open to a limited degree whenever the gas pressure in the gas induction line is below the starting pressure and the gas pressure returns slowly to the starting pressure after the subsurface valve mechanism has closed.

A third form of the invention operates on a cycle which starts the same as the first cycle in that accumulation of well fluid opens the subsurface valve mechanism. This causes a drop in pressure in the gas induction line but the surface controls do not respond to the change in gas pressure until there has been a considerable pressure drop and in the meantime a considerable quantity of gas has been admitted to the well fluid. The surface valve mechanism finally responds to admit gas to the gas induction passage and rapidly bring the pressure back to the starting pressure and above. When the pressure is a certain amount above the starting pressure the subsurface valve mechanism closes and at a slightly higher pressure the surface valve mechanism closes communication between the supply of gas under pressure and the gas induction passage. At all times when the pressure in the gas induction passage is above the starting point the surface valve mechanism opens a limited communication between the gas induction passage and the low pressure side of the supply of gas under pressure thereby bringing the gas pressure back to the starting point after the surface valve mechanism has closed communication to the high pressure side of the supply.

The fluid produced by the well may be a mixture of petroleum solids, liquids, and gases and other materials such as water, sand and basic sediment. Predominently it will be in liquid form. To further facilitate description of the invention this material will be referred to hereinafter as a liquid, or more simply, as oil. In both the specification and the claims however, these terms are to be understood to include any of the usual products of a well including water wells as well as petroleum wells except where the context otherwise indicates.

In all forms of the invention it is required that there be two passages from the top of the well to the bottom, one constituting the gas induction passage for conducting gas to the bottom of the well and the other constituting the oil eduction passage for conducting oil to the surface. In the usual well the hole will be lined with casing and a string of tubing will be run inside the casing. In such case the tubing will usually be the eduction passage for the oil and the annulus between the tubing and casing will be the gas induction passage. For convenience hereinafter this usual arrangement will be referred to for the purpose of facilitating description of the invention but it is to be understood that by mere interchange of position of the elements the gas can be admitted through the tubing and the well fluid produced through the annulus. Also, a greater or lesser number of strings of pipe can be used one inside the other as long as two passages are povided for the gas and well fluid.

Another feature common to all forms of the invention is a seal between the tubing and casing to prevent gas from blowing down around the end of the tubing and back up through the tubing around the well. In high bottom hole pressure wells this seal may be formed by the oil itself rising beyond the end of the tubing. In such case the oil pressure will be higher than the lift pressure. In the more usual arrangement however the seal will be in the form of a packer expanded between the tubing and casing. Before the packer is set all oil will be blown out of the annulus so that after the packer is set the annulus above the packer will be purely a gas passage. The use of a packer or similar fixed seal has a further advantage in that the highest extent of rise of oil in the annulus is exactly limited so that the gas responsive subsurface valve mechanism can be placed without fear that it will be blocked by being covered with oil as might occur in a packerless system. Also, the volume of the gas space in the annulus is more accurately fixed so that more exact determination can be made of the quantity of gas admitted to the annulus.

A further element shown in connection with all forms of the invention is a check valve at the bottom of the oil tubing. The principal purpose of this valve is to keep the gas pressure off the formation when the gas is admitted to the tubing. This is usually desirable to prevent back flow of the oil in the formation. However in the case of a packerless system such a check valve would be unnecessary. Also, according to some authorities some wells benefit by intermittent application of back pressure in which cases the check valve could be omitted also.

In most intermittent systems it is desirable to operate in such a way that a head of oil equal to that which the bottom hole pressure can support is never allowed to build up. Instead, the head of oil is initially blown off to a low level and thereafter whenever a barrel or so of oil accumulates it is blown off. In this manner the back pressure on the formation is reduced during the period the oil is accumulating so that it may flow in more rapidly. To achieve the initial reduction in the head of oil without utilizing a gas pressure excessively greater than that required to lift the oil during normal operation of the system, resort is had to a system of stage lift utilizing valves spaced along the tubing at intervals to admit gas to the tubing at successively lower levels, blowing off successive slugs of oil of the short length between each pair of valves. The valves are known as kick off, or unloading valves. A great variety of such valves are known and are suitable for use ancillary to the system of the invention. However for the purpose of illustration only two types of such valves will be shown, these two types being peculiarly well suited for use with the intermitter system of the invention.

One type of unloading valve especially suited for use with the system of the invention is described in United States Reissue Patent Number 21,998, granted January 6, 1942, to Maurice B. Thomas, and in United States Patent Number 2,317,121, also granted to Maurice B. Thomas, April 20, 1943. The valve of these patents operates in response to changes in the difference between the pressures above and below a column of liquid caused by changes in the specific gravity of the fluid in the tubing. Thus, when there is gas or aerated oil in the tubing which is of lower specific gravity than the liquid of the valve, the valve is closed. But when dead oil is in the tubing above and below the liquid of the valve, such dead oil having a higher specific gravity than the liquid of the valve, the valve will open. The valve is thus in reality a float operated valve using a light liquid as the float body and will hereafter be referred to as a float valve.

Another type of unloading valve that will be shown in connection with the system of the invention comprises a bellows actuated valve. The bellows may be expanded by a spring inside or by a charge of gas sealed therein. In either case the valve is opened by an increase in the gas pressure outside the bellows. Descriptions of valves of this type are to be found in United States Patents Number 1,803,837, granted May 5, 1931, to Mark P. Burke, and Number 2,339,487, granted January 18, 1944, to William R. King.

For a detailed description of several preferred embodiments of my invention illustrating it in three principal forms and showing a number of modifications thereof, reference will now be had to the accompanying drawings in which:

Figure 1 is an elevational view of a well partly in section and partly schematic, showing a gas lift system according to the invention operating on the first described cycle.

Figure 2 is a sectional detail of a portion of the bottom hole valve mechanism.

Figure 3 is a graph showing the changes in annulus gas pressure plotted as ordinates against time as abscissas.

Figure 4 is an elevational view of a well, partly in section and partly schematic, showing a modified form of a gas lift according to the invention operating on the first described cycle.

Figure 5 is a sectional detail of a portion of the surface valve mechanism.

Figure 6 is a graph similar to Figure 3 showing the variation in gas pressure in the system of Figure 4.

Figure 12 is an elevation of a well, partly in section and partly schematic, showing another modified form of the gas lift system according to the invention operating on the first described cycle.

Figure 13 is a sectional detail of the subsurface valve mechanism used in the system shown in Figure 12.

Figure 14 is a graph similar to that of Figure 3 showing the annulus gas pressure variations in the system of Figure 12.

Figure 15 is an elevation of a well, partly in section and partly schematic, showing another form of the gas lift system according to the invention operating on the second described cycle.

Figure 16 is a sectional detail of the subsurface valve mechanism used in the system shown in Figure 15.

Figure 17 is a graph similar to that of Figure 3 showing the annulus gas pressure variations in the system of Figure 15.

Figure 18 is an elevation of a well, partly in section and partly schematic, showing a modified form of gas lift system according to the invention operating on the second described cycle.

Figure 19 is a diagram showing various positions of a portion of the surface valve mechanism during a cycle of operation of the system of Figure 18.

Figure 20 is a sectional detail of the subsurface valve mechanism used in the system of Figure 18.

Figure 21 is a graph similar to that of Figure 3 showing the variations in the annulus gas pressure of the system of Figure 18.

Figure 22 is an elevation of a well, partly in section and partly schematic, showing still another form of the gas lift system according to the invention operating on the third described cycle.

Figure 23 is a sectional detail of the subsurface valve mechanism for the system shown in Figure 21.

Figure 24 is a graph similar to that of Figure 3 showing the variations in annulus gas pressure in the system shown in Figure 21.

Figure 7:
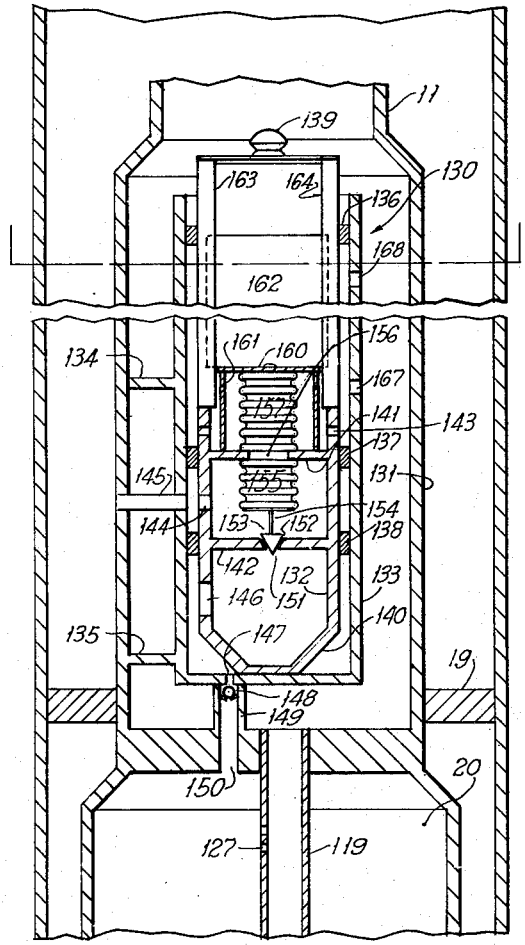
Figure 7 is a sectional detail of a modified form of subsurface valve mechanism to be used with the general system shown in Figure 4.

Referring to Figure 1 there is shown a well lined with a casing 10 and provided with an oil eduction tubing 11. The casing 10 extends to the bottom of the hole and is cemented as shown at 12. A portion of the casing opposite the producing formation 13 is perforated as indicated at 14. The top of the casing is closed and sealed to the tubing as shown at 15. Any suitable type of casing head construction may be used for the purpose. The casing head is provided with an opening connected to the gas supply line 16.

The tubing extends through the casing head to a point near the bottom of the hole opposite the producing formation. The bottom end of the tubing is closed as shown at 17. The portion of the tubing just above the closed end is perforated as indicated at 18. Somewhat above the level of the producing formation there is a packer 19 sealing between the tubing and casing. Starting a few feet above the level of the packer and continuing for perhaps several hundred feet the tubing may be of a somewhat larger diameter to provide an accumulation chamber as indicated at 20. Above the accumulation chamber at intervals the tubing may be provided with one or more unloading valves, preferably the float type previously described and shown at 21. The top of the tubing is connected to an oil line 22 through a valve 23.

The surface valve mechanism comprises a main valve 30 in the gas line 16. Valve 30 is a motor valve of the diaphragm actuated type. The valve stem 31 is connected to the diaphragm 32. The diaphragm and valve stem are normally urged upwardly by a spring 33 to open the valve. Gas under pressure admitted through conduit 34 will close the valve. When the supply of gas to conduit 34 is shut off or reduced the gas above diaphragm 32 will exhaust through port 35 allowing the spring 33 to open the valve.

Gas for operating motor valve 30 may be taken from any suitable source, but preferably is obtained from the main gas line 16 through conduit 36. A filter and drip shown at 37 is provided in the conduit 36 for cleaning the gas. A pair of series connected gas pressure regulators 38 and 39 are also connected in the conduit 36 for reducing the pressure from that in the gas line 16 to a pressure suitable for operation of the motor valve 30. Connecting the conduit 36 and conduit 34 there is a hollow body 40 having a restricted portion 41 and an exhaust port 42. For controlling the exhaust port 42 there is a flapper valve 43 pivotally mounted at 44 on the end of the Bourdon tube 45. The opposite end of the Bourdon tube is fixed by a clamp 46 and is connected by conduit 47 to the gas supply line 16 on the downstream side of valve 30. In the position shown the Bourdon tube is expanded so that the pivot point 44 is toward the extreme left of its travel. In this position the adjustably mounted permanent magnet 48 attracts the magnetic stem 49 of the flapper valve to the right so that the flapper valve 43 closes the exhaust port 42. Upon a drop in pressure in the casing annulus of the well the Bourdon tube will be contracted moving the pivot point 44 to the right. Fulcrum 50 prevents the center portion of the valve stem 49 from moving to the right, thus tending to cause the bottom of the valve stem carrying the flapper valve 43 to move to the left. At first the valve stem 49 will bend slightly about fulcrum 50 but ultimately the force of the magnet 48 will be overcome and the flapper valve will snap open and come to rest against adjustable stop 51. The action of the magnet 48 is to produce a snap action opening and closing of the exhaust port 42 and to produce a difference between the pressures in the Bourdon tube required for opening and closing the exhaust port. The adjustments for the magnet 48 and stop 51 permit the difference between the opening and closing pressures to be adjusted. The entire assembly is pivotally mounted at 53 and is adjusted in position by means of link 54 so that the range of operating pressures set by adjustment of the magnet 48 and stop 51 may be made to correspond to the range of travel of the end of the Bourdon tube produced by pressure which is conducted thereto through conduit 47.

Whenever exhaust port 42 is closed gas under pressure is supplied through conduit 34 to the space above diaphragm 32 of the motor valve 30 and moves the valve to closed position. This is the normal or rest position of the equipment corresponding to intervals between lifting operations. Whenever the pressure in the well casing annulus drops the Bourdon tube moves to open the exhaust port 42 thereby allowing gas passing through orifice 41 to exhaust to atmosphere. Because of the drop in pressure thus created across orifice 41 the pressure in conduit 34 is insufficient to hold motor valve 30 in closed position and the spring 33 opens the motor valve.

A by-pass line 60 controlled by a pressure regulator 61 permits small quantities of gas to flow into the casing annulus as long as the pressure in the casing annulus is below the closing pressure to which adjustable regulator 61 is set. The rate of flow through by-pass line 60 is regulated by means of needle valve 62. If desired the by-pass line could be omitted and the same effect could be obtained by providing means to open the main motor valve 30 a slight amount whenever the pressure in the annulus is below the normal pressure. For the purpose of controlling the gas flow in the surface valve mechanism when first installed or when being repaired a number of manually operated gas valves 63, 64, 65 and 66 are provided.

The subsurface valve mechanism comprises a main bellows actuated valve 70 and a pilot valve 71 and also preferably a check valve 72. The pilot valve is constituted by the lowermost unloading valve and is identical with the other unloading valves 21 thereabove. The check valve comprises a ball seat 73, a ball valve 74 and a ball retaining cage 75.

The main gas valve 70 may be identical with the pressure operated unloading valve previously described. As shown in detail in Figure 2, it comprises a valve member 76 closing against valve seat 77. The valve member 76 is carried by a valve stem 78 that is connected to a sealed bellows 79 which is mounted at its other end in the top of a housing 80. The bellows 79 may contain a spring, or gas under pressure, or other elastic means. The housing 80 is provided with a number of apertures 81 which expose the exterior of the bellows to the fluid pressure within the casing annulus. The housing 80 is supported by a pipe 82 which is suitably connected to the tubing as shown at 83.

When the apparatus previously described is first installed in the well and before the packer is set, the head of oil in the tubing and casing annulus is initially lowered by means of the unloading valves. All the float valves 21 and 71 below the level of the oil will be open so that when gas is admitted to the annulus the gas pressure will force oil from the annulus to the tubing through the uppermost of the open unloading valves and out through the tubing. As the oil rises in the tubing past the unloading valve immediately above, that valve will open admitting gas to the oil and aerate it. This will continue until the level of the oil in the casing is lowered below the inlet to the next unloading valve, whereupon gas will be admitted through that valve to aerate the oil in the tubing thereabove which will cause the gas valve above to close because of the lowered specific gravity of the oil. This process will continue, oil entering through one unloading valve and gas entering through the unloading valve immediately above until the oil level is lowered beneath the lowermost float valve 71. The gas pressure will then be increased slightly so as to first open the bellows valve 70 to force oil therethrough into the tubing, and then when the level of oil is below bellows valve 70, to admit gas to the tubing through the valve 70 while forcing the oil into the tubing through the perforated section at the lowermost end thereof. When the oil has been lowered well below the level of the packer, the packer is set and the system is then ready for normal operation, the gas pressure being returned to normal operating pressure so that the valve 70 is closed.

Oil will begin to rise in the tubing past check valve 72 into the accumulation chamber 20. The packer will prevent the oil from rising in the annulus. When the oil has finally filled the accumulation chamber it will rise in the tubing section immediately above and when it has risen to the top of the fluid column of the liquid float valve 71 the float valve will open admitting gas from the annulus to the tubing. Since there is no oil above the valve 71 this gas will merely exhaust out the top of the tubing and will immediately cause a drop in pressure in the annulus. A drop in pressure in the annulus will cause the Bourdon tube 45 of the surface valve mechanism to contract thereby opening the flapper valve 43 and reducing the gas pressure in the chamber above the diaphragm 32 of the motor valve 30. The motor valve will open admitting gas to the annulus at a much higher rate than it is being exhausted through the pilot valve 71 so that the gas pressure in the annulus will increase. A slight rise in the annulus gas pressure above the original starting pressure will open the bellows valve 70 and admit gas to the tubing below the accumulation chamber. The check valve 72 will close, preventing the gas pressure from acting on the formation and the gas will lift the oil in the accumulation chamber through the tubing 11. The rate at which gas is admitted to the annulus through the motor valve 30 at the surface is higher than the rate at which it is exhausted through both the pilot valve 71 and the main subsurface gas valve 70 so that the annulus gas pressure continues to rise. When the gas admitted to the tubing through valve 70 has lifted the oil past the pilot valve 71 the pilot valve closes, since it is responsive only to the density of the fluid opposite the valve, which is then gas. This causes the annulus gas pressure to increase at a slightly higher rate. When the annulus gas pressure reaches a predetermined value the Bourdon tube 45 will be expanded sufficiently to allow the magnet 48 to close the flapper valve 43 of the surface controls. This will cause the motor valve 30 to be closed. Gas will continue to enter the tubing through the subsurface gas valve 70 until the annulus pressure drops to the starting pressure, at which point valve 70 closes. The gas then in the tubing will continue to expand and carry the oil to the surface.

The time of closing of the motor valve 30 at the surface is adjustable at the surface and can be adjusted by trial until it closes when just sufficient gas has been admitted to the annulus to expel the oil from the tubing. Since the volume of the annulus above the packer is fixed, the amount of gas admitted thereto necessary to raise the pressure a predetermined amount corresponds to a definite quantity of gas. Also, since the volume of the tubing between the level of the subsurface gas valve 70 and the pilot valve 71 is fixed, a definite quantity of oil is accumulated in each cycle of the intermitter. Therefore, the gas-oil ratio in an intermitter operating on a system according to the invention is not only adjustable from the surface but is fixed for any given adjustment.

In case there are any leaks in the casing it is desirable that a small quantity of gas be fed to the annulus to maintain the gas pressure at the normal between-lifts level, for if the pressure should drop sufficiently to actuate the surface controls a false operation would occur. The by-pass line 60 containing the pressure regulator 61 and needle valve 62 serves the purpose of maintaining the annulus gas pressure between lifts. The needle valve 62 is adjusted so that the rate of admission of gas to the annulus through the by-pass 60 is much lower than the rate of exhaust from the annulus to the tubing when the pilot valve 71 opens so that the by-pass does not prevent actuation of the system at the proper time.

The graph in Figure 3 plots the variations in annulus gas pressure during each cycle of operation. At *a* the system is at rest and the pressure is normal. At *b* the float valve 71 opens causing the gas pressure to drop until at *c* the surface gas valve opens. The pressure then rises until at *d* the main subsurface gas valve opens. The pressure continues to rise at a lower rate until the pilot valve 71 closes at *e*. The pressure then rises at a slightly higher rate until the surface gas valve closes at *f*. The pressure then drops until the subsurface valve 70 closes at *g* at which point the pressure in the annulus is the same as that at *a*.

The system shown in Figure 4 is generally similar to that shown in Figure 1 and to the extent the systems are identical like reference characters have been used to designate like parts. The main differences between the systems of Figure 1 and Figure 4 are, first, the surface valve mechanism of the Figure 4 system includes a kinetic type of mechanism for initially opening the main gas valve instead of a static pressure type of mechanism as shown in Figure 1, and second, the pilot valve shown in Figure 4 is modified so that gas is admitted behind the oil rather than exhausted to the tubing. In addition, pressure type unloading valves are shown in Figure 4 in place of the float type unloading valves of Figure 1 and the bottom hole construction is slightly modified in Figure 4.

The surface valve mechanism comprises motor valve 90 similar to the motor valve 30 of Figure 1 except that downward motion of the valve stem opens the valve instead of closing it. Gas for actuating the motor valve is taken from the main gas line through conduit 36 and a combination filter, drip and pressure regulator shown at 91 to one end of a hollow body 92 which is connected to conduit 34 leading to the motor valve. Body 92 contains a restricted passage 93 between the conduits 36 and 34, and the end of the body opposite to that at which conduit 36 is connected is provided with two openings 94 and 95 to the atmosphere. Opening 94 is normally closed by a valve 96 carried on valve stem 97 connected to one end of a Bourdon tube 98. Stem 97 has an arm 99 extending at right angles therefrom which engages a trip lock later to be described. The other end of the Bourdon tube is fixed at 46 and connected through conduit 47 to the main gas supply line 16 on the down stream side of the motor valve 90. The other opening 95 in the hollow body 92 is normally open and is adapted to be closed by valve 100 carried by a valve stem 101 connected to a diaphragm 102. A spring 103 normally urges the diaphragm to the left to maintain the valve 100 in open position. The chamber to the left of the diaphragm is connected by conduit 104 to a dart valve 105 and thence through conduit 106 to the gas supply line 16 on the down stream side of the motor valve 90. The chamber to the left of the diaphragm 102 is also provided with an exhaust port 107.

Referring to Figure 5 there are shown the details of the dart valve 105 which comprises a valve member 108 carried by a valve stem 109 which is connected at its opposite end to a check valve 110. A helical spring 111 connected to the check valve 110 and also to valve stem bearing 112 is normally in tension tending to close the valve 108. Bearing 112 is carried inside a conduit 113 which forms a T connection with the conduits 104 and 106 and which is connected to the gas supply line 16 down stream from the conduit 106. Whenever there is a substantial flow of gas through gas supply line 16 a portion of the gas will also flow through conduits 106 and 113 thus closing check valve 110 against its seat 114. In this connection it is to be noted that the bearing 112 is provided with apertures 112a sufficient to permit a substantial flow of gas and the check valve 110 has sufficient area so that the dynamic pressure of the flowing gas will be sufficient to overcome the slight tension of spring 111. When the check valve 110 closes the valve 108 opens admitting gas through conduits 106 and 104 to the chamber to the left of the diaphragm 102, thus actuating valve 100 to close port 95 in the hollow body 92. This will cause the pressure in hollow body 92 on the left side of the orifice 93 to build up and this pressure will be transmitted through conduit 94 to the motor valve 90 which will be opened. When stem 101 moves to the right to close valve 100 it also carries arm 84 connected thereto to the right. This causes the end 85 of trip lock lever 86 to move over the top of arm 99 on valve stem 97. Upon an increase in pressure in the gas supply line 16 on the down stream side of valve 90 gas conducted through conduit 47 to Bourdon tube 98 will expand the tube and lift valve 96 to open port 94 to the atmosphere. This will cause the motor valve 90 to close. As the Bourdon tube expands it also carries arm 99 on stem 97 upwardly past end 85 of the trip lock lever 86 which turns about pivot 87 on the right angle extension 88 of arm 84. A subsequent decrease in pressure in the gas supply line 16 on the downstream side of valve 90 will tend to cause Bourdon tube 98 to contract and tend to move valve stem 97 downward. Its movement is blocked however by end 85 of trip lock lever 86 which is under arm 99 on valve stem 97. Lever 86 is prevented from turning clockwise by pin 89 on its opposite end from end 85, pin 89 abutting against the under side of extension 88 of arm 84. Valve 96 thus cannot close until valve 96 opens again carrying the trip lock lever out of the path of arm 99.

The bottom hole construction shown in Figure 4 differs from that of Figure 1 in that the casing is cemented above the level of the formation rather than below and a liner 115 having a perforated screen portion 116 on the lower end thereof is supported within the formation and sealed at its top to the casing as shown at 117. The bottom end of the screen is closed as indicated at 118. A check valve 72 is provided at the bottom end of the tubing as in the system shown in Figure 1 and an accumulation chamber 20 is provided thereabove. However, the packer 19 is above the accumulation chamber rather than below as in the previously described form of the system. This is made possible by the provision within the accumulation chamber of a macaroni string 119 which extends from a point slightly above the check valve 72 to a point a slight distance above the top of the accumulation chamber where it is connected to and sealed with the interior of the tubing as shown at 120. With this arrangement the main sub-surface gas valve 70 can be connected to the top of the accumulation chamber and when it opens the gas will force oil downwardly in the accumulation chamber and thence upwardly out through the macaroni string.

The pilot valve 121 differs from the valve 71 of Figure 1 in that the gas conduit 122 extends downwardly from the valve rather that upwardly. The purpose of this change is to admit the gas to that portion of the tubing below the seal 120 so that the gas will aid in lifting the oil instead of wasting. Conduit 123 places one side of the diaphragm for actuating the valve in communication with the liquid in the tubing and the liquid float column extends upwardly from the other side of the diaphragm the same as in the valves shown in Figure 1. Although not shown in the schematic diagram of the drawings there is a separation chamber at the top of the liquid column 124 to prevent the liquid from mixing with the fluid in the tubing. This is fully described in the Thomas patents previously referred to.

The unloading valves 125 are of a construction similar to that of the main subsurface gas valve 70 but are set to open at higher pressures than any pressure existing in the annulus during the normal operation of the system. The opening pressures of these valves are set in descending order of pressures accoding to the distance below the surface, the top valve opening at the highest pressure. When the apparatus is first installed the gas pressure in the annulus is initially raised to a pressure sufficient to open the uppermost of the unloading valves 125 and then after the oil level lowers the gas pressure is gradually reduced, thus allowing the upper valves to close successively while maintaining at least one valve open to admit gas to the tubing and lower valves open to admit oil. As with the system shown in Figure 1, when the oil level has been lowered well below the level of packer 19 the packer is set, thereby preventing any oil from rising into the annulus above.

In the operation of the system in Figure 4 oil rises past check valve 72 into the accumulation chamber 20 and the macaroni string 119. Any gas already in the accumulation chamber, either lift gas from the casing annulus or formation gas, escapes into the tubing through port 127 in the macaroni string so that the system is never rendered inoperative by gas lock. When oil has filled the accumulation chamber and risen above the seal 120 to a level near the top of the liquid fluid column 124 of pilot valve 121 the pilot valve will open to admit gas to the accumulation chamber through conduit 122. This will cause a flow of gas through the surface gas supply line 16 even though motor valve 90 is closed since there is considerable volume of gas in the line 16 on the downstream side of motor valve 90. This flow of gas in line 16 will actuate the dart valve 105 admitting gas to the left side of diaphragm 102 closing valve 100 and thus admitting gas through conduit 34 to actuate motor valve 90 which moves to the open position. Gas will then be admitted to the annulus at a higher rate than it is being admitted to the tubing through pilot valve 121 and hence the annulus gas pressure will rise rapidly. When the pressure reaches a predetermined point higher than the initial annulus pressure the main subsurface gas valve will open admitting gas to the space above the oil in the accumulation chamber 20. This gas together with that admitted by pilot valve 121 will eject the oil from the accumulation chamber through macaroni string into the tubing.

As with the embodiment shown in Figure 1 the rate of admission of gas through surface valve 90 is greater than the rate at which it is admitted to the accumulation chamber through pilot valve 121 and main subsurface gas valve 70 so that the annulus gas pressure will continue to rise. When the oil has been expelled from the accumulation chamber and lifted beyond the pilot valve 121 the pilot valve will close. The annulus gas pressure will then rise at a slightly higher rate. When the annulus gas pressure reaches a predetermined value the Bourdon tube 98 of the surface valve mechanism will expand opening port 94 in hollow body 92 thereby reducing the pressure transmitted to the motor valve 90 through conduit 34 and allow the spring 33 to close the valve. The annulus gas pressure will then drop. The Bourdon tube 98 will contract tending to re-close port 94 but will be prevented from so doing by the trip lock lever 86. The pressure drops to the starting pressure, at which point subsurface gas valve 70 closes. This stops the flow of gas in line 16 and the dart valve closes causing valve 100 to open, which in turn causes the motor valve 90 to close. At the same time valve 100 is opened its stem 101 carries the trip lock lever 86 to the left out of the path of arm 99 on valve stem 97 which permits the Bourdon tube 98 to close valve 96 in preparation for the next cycle. The gas already in the tubing will continue to expand and eject the oil from the tubing at the surface of the well.

As with the system shown in Figure 1 the pressure at which motor valve 90 is closed by expansion of Bourdon tube 98 can be adjusted at the surface. In the system of Figure 4 this adjustment can be made by changing the length of the valve stem 97 which can be provided with an adjustment such as that shown at 126. Thus the quantity of gas admitted to the annulus, and hence to the tubing, is adjustable at the surface so that the gas-oil ratio can be set at the desired value. No by-pass gas line around motor valve 90 is required in the system shown in Figure 4 since the system is not operated by a simple drop in the static pressure in the annulus such as might be caused by leaks in the casing but requires a substantial flow of gas in the gas supply line 16 in order to operate the dart valve 105. The dart valve 105 has the further advantage that it can be made to respond more quickly to the opening of the subsurface pilot valve so that the initial action of the system is quicker than that of the system shown in Figure 1.

Referring to Figure 6 there is shown a graph of the variations in gas pressure in the annulus plotted against time. The cycle is substantially the same as that for the system of Figure 1. It may be noted, however, that the initial drop in pressure prior to opening of the main surface gas valve indicated at $c$ is less than the corresponding drop in pressure shown in Figure 3. Also the rate of drop initially from $b$ to $c$ is less in Figure 6 than in Figure 3 because the gas from the pilot valve is admitted behind the oil in the Figure 4 system instead of allowed to exhaust into the tubing about the oil as in the system of Figure 1. For the same reason the slope $c—d$ is somewhat steeper in Figure 6 than in Figure 3. Also, since the gas admitted to the accumulation chamber by the pilot valve 121 helps to raise the oil from the accumulation chamber the oil will rise beyond the accumulation chamber more quickly in the Figure 4 system than in the system of Figure 3 so that the time $d—e$ is somewhat shorter. The remainder of the Figure 6 cycle is substantially identical with that of Figure 3.

Referring to Figure 7 there is shown a modified form of subsurface valve mechanism in which the pilot valve 121 is eliminated and in which the buoyancy member for initially actuating the mechanism is a solid heavier than oil instead of a liquid float. The subsurface gas valve designated generally by reference number 130 is located within the tubing string in a section 131 of somewhat increased diameter which connects the upper portion of the tubing string 11 to the accumulation chamber 20. The valve 130 is contained within a housing 132 which is supported within a receiver 133 mounted inside the tubing section 131 and connected thereto by supporting struts 134 and 135. The tubing section 131 is of such diameter that the annular space between the receiver 133 and tubing section 131 is equal to the area of tubing 11 so that there is adequate room for upward passage of oil around the valve 130. A plurality of ring shaped seals 136, 137 and 138 made of some resilient material such as neoprene are secured to the inner wall of the receiver 133 and are of slightly smaller internal diameter than the outside diameter of the valve housing 132. When the valve is lowered through the tubing supported by means of knob 139 connected to the end of a wire line the tapered bottom portion 140 of the valve housing will guide the valve centrally within the receiver 133 and when the main part of the valve housing 132 enters the receiver 133 it will compress the sealing rings 136, 137 and 138 to make a tight joint therewith. The bottom 140 of the valve housing will rest against the bottom of the receiver 133. The wire line can then be manipulated to free it from the knob 139 leaving the valve in place. Whenever it is desired to remove the valve it can be fished out by means of a wire line.

The valve housing 132 is divided into three chambers by means of partitions 141 and 142. There are ports 143 and 144 in the side of the valve housing, port 143 being above partition 141 and port 144 being between the partitions. Seals 137 and 138 between the valve housing and the receiver located respectively above and below port 144 and both below port 143 form an annular space in communication through port 144 with the central chamber of the valve housing between partitions 141 and 142. A conduit 145 connects this annular space with the annulus between the casing and tubing. The space below partition 142 in the valve housing 132 is connected by port 146 to the space below the seal 138 in the receiver 133. This latter space in the bottom of the receiver 133 is connected through port 147, check valve 148 and conduit 149 to port 150 in the top of the accumulation chamber 20.

Port 151 provides a passage for communication between the central and lower chambers of the valve housing 132 and is provided with a valve seat 152 which is normally closed by valve 153 carried on the end of valve stem 154. The upper end of valve stem 154 is connected to the bottom end of a bellows 155. The upper end of bellows 155 is secured to partition 141 with the open end of the bellows surrounding port 156 in the center of partition 141 with its open end surrounding the port 156 and sealed to the partition 141 the same as bellows 155. The upper end of bellows 157 is closed and a sealed chamber thus provided within the two bellows 155 and 157. The two bellows will hereafter be referred to together as a double bellows.

Figure 8:
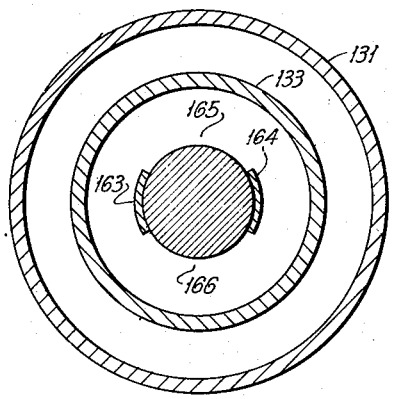
Figure 8 is a section taken on the line 8—8 of Figure 7.

Circular plate 160 is secured to the top of the upper bellows 157 and is adapted to bear against stop 161 which is in the form of a cylindrical open mesh cage surrounding bellows 157. Engagement of plate 160 with stop 161 limits the downward travel of plate 160 and thus limits the degree to which upper bellows 157 can be compressed. A cylindrical weight bar 162 rests on top of plate 161. This bar may be quite long and is guided in its up and down travel by means of ribs 163 and 164 (see Figure 8) traveling between guides 165 and 166 on the top of valve housing 132. The fit between ribs 163 and 164 and guides 165 and 166 is sufficiently loose so that oil entering through ports 167 and 168 in the receiver and between the seals 136 and 137 can pass inside the valve housing to the space above partition 141 around upper bellows 157. Additional communication is provided by port 143 in the side of the valve housing 132.

The space within the double bellows 155 and 157 may be filled with gas under pressure which normally is slightly higher than the pressure within the casing-tubing annulus so that valve 153 rests against seat 152 and closes port 151. The weight 162 is only slightly heavier than is necessary to cause upper bellows 157 to be compressed so that plate 160 rests against stop 161.

The operation of the subsurface valve mechanism of Figure 7 is similar to that of subsurface valve mechanism of Figure 4. Oil will rise in the tubing past check valve 72 into the accumulation chamber. Check valve 148 prevents the oil from entering the gas valve housing. (A similar oil check valve could be used with the subsurface gas valves shown in Figures 1 and 4.) When the oil has filled up the accumulation chamber 20 and risen in the tubing section 131 to a level near the top of weight 162 the oil will exert a greater pressure below the weight than above it, thereby taking some of the downward force off of upper bellows 157 and allowing it to expand. It is necessary that the area of the bottom of the weight 162 be considerably larger than the area of the top of the bellows 157 so that the reduction in force against the top of the bellows due to the buoyancy effect on weight 162 will be greater than the increased force on the bellows due to the downward weight of the oil above it. The area of the bottom of the weight, the area of the top of the bellows, the density of the weight and the length of the weight should be so chosen as to produce the desired initial downward force upon the bellows and the desired reduced force upon the bellows when oil has risen to the top of the weight. The density of the weight can be adjusted for any given length thereof by drilling holes in the side thereof which can be filled with lead, or if it is desired to lighten the weight, can be left empty. In a usual system using gas pressure of around 500 pounds per square inch the weight 162 may be as heavy as 400 or 500 pounds. This heavy weight serves the additional purpose of retaining the valve housing 132 seated within the receiver 133.

When the bellows 157 expands upon the buoying up of weight 162, the internal pressure of the double bellows 155 and 157 will be reduced below the normal pressure within the casing annulus. This will cause the lower bellows 155 to be compressed, thereby opening the main gas valve 153. Gas will flow through ports 151 and 146 into the bottom of the receiver 133 and thence through conductor 149 to the top of the accumulation chamber 20. The gas will force the oil downward in the accumulation chamber and up through the macaroni string 119 and thence out through tubing section 131 and tubing string 11. The drop in pressure in the casing annulus thus caused will actuate the surface valve mechanism before the casing pressure drops sufficiently to close valve 153 by expansion of lower bellows 155, and also before the gas admitted to accumulation chamber 20 has had sufficient time to raise the oil past the buoyancy member 162 which would cause the upper bellows to contract thereby expanding the lower bellows again and closing the valve 153. As soon as the surface controls are actuated the main surface gas valve opens and the annulus pressure begins to build up again. The pressure will build up fast enough so that the pressure will be above the normal pressure of the annulus a sufficient amount to hold the bellows 155 compressed before the gas drives the oil away from the buoyancy member 162. Thereafter the gas will lift the oil above the buoyancy member 162 which will cause the weight 162 to compress bellows 157 until plate 160 rests on stop 161. Any further compression of bellows 157 such as might otherwise occur because of the increase in pressure in the tubing due to the gas will be prevented by stop 161. The gas pressure will continue to rise until the surface controls are actuated to close the main surface gas valve. The annulus pressure will then fall until it reaches the original pressure, at which point bellows 155 will expand and close valve 153. It is to be noted that the direction of gas flow through port 151 is such as to help valve 153 close, thereby preventing any undue amount of metering action on closing of the valve. Upon closure of the valve the pressure beneath the valve will decrease, thereby increasing the differential, tending to maintain the valve closed. The gas in the tubing will continue to expand and expel the oil at the surface of the well.

Figure 9:
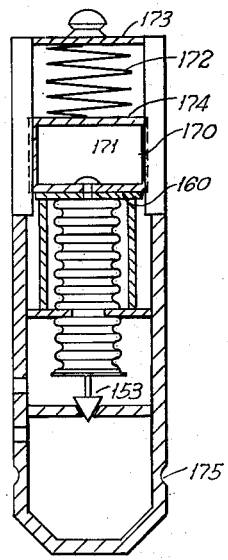
Figure 9 is a sectional detail of a subsurface valve mechanism similar to that of Figure 7 but slightly modified.

Referring to Figure 9 there is shown a slight modification of the subsurface valve mechanism shown in Figure 7. In this modification the weight 162 is replaced by a float 170. The float 170 is of construction similar to that of weight 162 except that it is hollowed out as indicated at 171 and is positively secured to the plate 160 on top of the bellows 157. In order to supply the necessary force to maintain bellows 157 sufficiently compressed to close valve 153 a spring 172 is provided between the top 173 of the valve housing 132 and the top 174 of the float 170.

Figure 10:
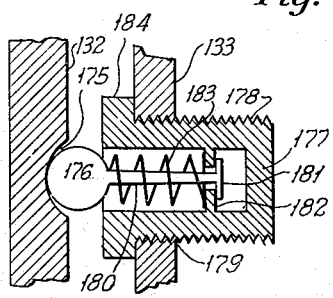
Figure 10 is a sectional detail showing a device for holding the subsurface valve mechanism in place.

Since the float 170 will not be as heavy as the weight 162 it is desirable to provide some means for retaining the valve housing within the receiver. For this purpose an annular groove 175 is formed in the outside of the valve housing 132 near the bottom end thereof. Referring to Figure 10, one or more spring pressed detents 176 may be provided around the inner wall of the receiver 133. As shown the detent 176 is spherical to fit within the arcuate section of the groove 175. The detent 176 is carried within the housing 177 which is provided with threads 178 for engagement with corresponding threads in aperture 179 formed in receiver 133. The detent 176 has a stem 180 carrying a T-head 181 at its opposite end for engagement with stops 182 which limit the outward travel of the detent under influence of compression spring 183. The shoulder 184 on housing 177 is of slightly less thickness than seals 136, 137 and 138 in the receiver 133.

When valve housing 132 is inserted in the receiver 133 it will first compress the detent 176 within the housing 177 until the groove 175 is reached, at which point the detent 176 will snap back out into the groove 175. The curved surfaces of the detent 176 and groove 175 are such as to produce a slight wedge effect when the valve housing is removed thereby causing the detent to be forced back into its housing when sufficient pull is exerted on nob 139. However, the slope of the abutting surfaces of detent 176 and groove 175 is sufficiently high so that considerable force must be exerted before the valve can be removed. If desired the valve housing retaining means shown in Figure 10 can be used with the construction shown in Figure 7 and also with any of the other removable valve constructions shown in figures yet to be described.

Figure 11:
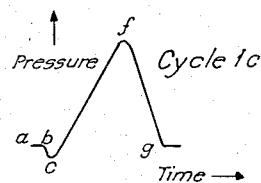
Figure 11 is a graph similar to Figure 3 showing the annulus gas variations in systems similar to that shown in Figure 4 except modified by incorporation of a subsurface valve mechanism of the type shown in Figures 7 and 9.

The operation of the subsurface valve mechanism shown in Figure 9 is exactly the same as the operation of the subsurface valve mechanism shown in Figure 7. Figure 11 is a graphic representative of the variations in the annulus gas pressure during the operation of the system. Starting at $a$ the pressure is the normal, or rest pressure of the system; $b$ represents the initial opening of the subsurface gas valve; $b$—$c$ indicates the initial drop in pressure prior to actuation of the surface valve mechanism; $c$ is the point at which the main surface gas valve opens; $c$—$f$ indicates the rise in pressure in the annulus following opening of the surface gas valve; $f$ is the point at which the surface gas valve is closed following a rise in pressure to the predetermined point; f—g shows the drop in pressure following closure of the main surface gas valve; g indicates the closure of the subsurface gas valve upon return of the annulus pressure to the starting pressure. It will be noted that the pressure diagram shown in Figure 11 is quite similar to those shown in Figures 3 and 6, the principal differences lying in the elimination of the slight kink d—e of the rising gas pressure line c—f due to the elimination of the pilot valve.

In Figure 12 there is shown another modification of the system of the invention operating on the first described cycle. A single valve subsurface valve mechanism 185 is used similar to those of Figures 7 and 9 and to be distinguished from the two valve subsurface valve mechanisms of Figures 1 and 4. The bottom hole completion is the same as that shown in Figure 4 comprising a liner 115 and a screen 18. Also as in Figure 4 an accumulation chamber 20 having a macaroni string 119 is used and pressure type unloading valves 125 are provided. The surface valve mechanism is similar to that shown in Figure 1 except that a clock mechanism is used to determine the time of cut off of the main surface gas valve.

The subsurface valve mechanism 185 is shown in detail in Figure 13. Since the mechanism is so similar to that of Figure 7 only the differences will be referred to. In place of a buoyancy member a differential bellows 186 is provided secured to the inside of tapered top 186a of the valve housing 132. The bellows 186 is under internal pressure of gas or some other elastic means such as a spring which causes button 187 carried by plate 188 secured to bellows 186 normally to bear against plate 160 on upper bellows 157. Plate 188 also cooperates with open mesh cage type stops 189 to limit compression of bellows 186.

The force of button 187 helps spring 172a to normally hold the bellows 157 compressed with plate 160 bearing against stops 161. The area of the end of bellows 186 is greater than that of bellows 157 so that when there is an increase of pressure in the tubing the increased force upwardly compressing bellows 186 is greater than the increased downward force on bellows 157. The increased upward force on bellows 186 reduces the downward force transmitted to bellows 157 by button 187. The net effect therefore of the initial increase in tubing pressure is to reduce the force on the end of bellows 157. The relative areas of the bellows and their internal pressures and the tension of spring 172a are so chosen that when a predetermined head of oil builds up above subsurface valve mechanism 185 the upper bellows 157 will expand thereby reducing the internal pressure of double bellows 155—157 and causing lower bellows 155 to contract, opening valve member 153. If desired, stops 189a similar to stops 189 can be provided to cooperate with plate 188a on the lower end of bellows 155 to limit its further compression.

When the gas reaches the tubing the increased pressure acting on the differential bellows 186 compresses it until plate 188 rests against stops 189 while at the same time the increase in tubing pressure on upper bellows 157 is sufficient to more than make up for the drop in force transmitted through button 187 so that the upper bellows 157 contracts again until plate 160 rests against stops 161. The upper bellows is then independent of the differential bellows, the button 187 being out of contact with plate 160. The action of differential bellows 186 is thus the same as that of the buoyancy members of Figures 7 and 9 in that the build up of oil causes the upper bellows to expand but later the presence of gas in the tubing causes the upper bellows to contract again.

The surface valve mechanism comprises a motor valve 30 which is moved to closed position upon increase in gas pressure above the diaphragm 32. Gas pressure for actuating the motor valve is supplied from conduit 36 connected to the main gas supply line 16 through a combination filter, drip and pressure regulator 91. A hollow body 10 connects the conduit 36 to the conduit 34 which opens to the space above diaphragm 32. A restricted passage 41 limits the rate of gas flow through body 10. A flapper valve 190 is disposed to normally close port 42 in hollow body 10, being pivoted at 191 and urged to port closing position by a spring 192. The flapper valve 190 is periodically opened and closed depending on the position of cam 193 which is rotatably mounted on shaft 194 driven by stop clock motor 195. Motor 195 is controlled by push lever 196. The construction is such that upon upward motion of lever 196 motor 195 operates to turn shaft 194 one revolution and then stops. The motor will operate to drive the shaft 194 one complete revolution even though lever 196 is moved downwardly prior to completion of one revolution but will not operate more than one revolution even though lever 196 is maintained in its upper position. To cause the clock to start again the lever 196 must be first moved down again and then back up to the motor starting position. Stop clock mechanisms of this type are known and need not be described in detail. Lever 196 is actuated by Bourdon tube 197 connected through conduit 47 to main gas supply line 16 on the down stream side of motor valve 30.

The surface valve mechanism also includes a by-pass line 60 having a pressure regulator and needle valve 62 therein the same as in the system shown in Figure 1.

In operation of the system of Figure 12 when sufficient oil has built up past check valve 72 into the accumulation chamber 20 to fill the accumulation chamber and then has risen in the tubing to the predetermined height the upper bellows 157 will expand, the lower bellows 155 will contract, and the valve member 153 will open admitting gas through ports 146 and conduit 149 to the top of the accumulation chamber 20. This will cause a drop in pressure in the annulus which will permit the Bourdon tube 197 of the surface valve mechanism to contract thereby pushing up on lever 196 and starting clock motor 195. This will turn cam 193 from the rest position shown in Figure 12 to a position where the high part of the cam will press against the upper end of the stem of valve 190 pivoting it about point 191 and opening port 42. This will reduce the pressure transmitted through conduit 34 to the upper surface of diaphragm 32 and allow spring 33 to open motor valve 30. The drop in pressure in the casing annulus required to actuate the surface valve mechanism is not sufficient to close valve 153 by expansion of lower bellows 155, the internal pressure of the double bellows 155—157 being reduced due to expansion of the upper bellows 157. Furthermore, the surface valve mechanism will be actuated before the gas admitted to accumulation chamber 20 has had sufficient time to raise the oil past the upper bellows 157 which would cause the upper bellows to contract under the gas pressure, thereby expanding the lower bellows again and closing the valve 153 prematurely.

When the motor valve 30 opens gas will be admitted to the casing annulus at a higher rate than it is exhausted through the subsurface valve to the tubing so that annulus gas pressure will rise. The pressure will build up fast enough so that the pressure will be above the normal pressure of the annulus a sufficient amount to hold the bellows 155 compressed before the gas reaches the upper bellows 157 and compresses it again. When the gas does reach the upper bellows the contraction of the upper bellows is limited by plate 160 abutting against stop 161.

After a predetermined time clock motor 195 will have driven cam 193 to a position where it permits spring 192 to close valve 190 thus preventing exhaust of air from hollow body 10 through port 42. This will increase the pressure transmitted through conduit 34 to the upper surface of diaphragm 32 and close motor valve 30. The annulus gas pressure will then start to fall. When the annulus gas pressure falls to a point only slightly above the starting pressure the lower bellows 155 will expand, the double bellows pressure being high again due to compression of the upper bellows, thus closing the subsurface gas valve. The gas in the tubing will continue to expand and raise the oil to the surface. As the tubing pressure drops the upper bellows 157 will momentarily expand again opening the subsurface valve but the pressure will quickly drop further and differential bellows 186 will expand and compress bellows 157, again closing the subsurface valve. The cycle is complete.

The normal pressure in the annulus is maintained despite any leaks in the casing by the bypass 60 of the surface valve mechanism. If desired the regulator 61 could be set to maintain the annulus pressure at that pressure at which the subsurface valve first closed. In such case when the annulus pressure drops due to the momentary reopening of the subsurface valve at the end of the cycle gas would enter the annulus through the needle valve 63, regulator 61 and by-pass 60 at a slow rate until the annulus pressure returns to the desired pressure. The cycle would then be complete. However it is preferable to set the surface controls at a pressure corresponding to that at which the subsurface valve re-closes to avoid any possiblity of false actuation of the surface valve mechanism by the slight drop in annulus pressure at the end of the cycle.

Referring to Figure 14 which shows a graph of the pressure time relations in the casing annulus during a cycle, the normal annulus pressure is indicated at $a$. At point $b$ the subsurface valve opens and the gas pressure drops until the point $c$ is reached at which surface gas valve 30 opens. The annulus gas pressure then rises until at point $f$ the surface gas valve 30 closes. The gas pressure then falls to point $x$ at which the subsurface gas valve closes. At point $y$ the subsurface gas valve opens again momentarily but re-closes at point $g$.

The system of Figure 12 differs from the previously described systems in that the cut-off of the supply of gas to the annulus is dependent solely upon the elapse of a predetermined time governed by the operation of the clock motor, whereas in the previous systems the cut-off was determined by the build up of pressure in the annulus. However, the system of Figure 12 will function to admit a predetermined quantity of gas to the annulus the same as the other systems because the flow through the orifice formed by motor valve 30 will be fairly uniform for any given supply pressure and annulus pressure so that the flow through the motor valve 30 for a definite time corresponds to the admission of a definite quantity of gas. The time at which valve 30 opens is adjustable by varying the length of lever 196 or the relative positions of the clock and Bourdon tube. The time at which the valve 30 closes is adjustable by varying the speed of the clock motor or by changing the cam 193 to substitute a cam of a different shape. If desired additional control means may be provided to maintain constant the rate of flow from the source of supply to the annulus regardless of changes in the supply pressure and the annulus pressure. Such means could be further compensated to care for changes in the density of the gas and changes in the ambient temperature. However such highly accurate control of the rate of flow is usually unnecessary.

Referring to Figure 15 there is shown a gas lift system operating upon the second described cycle. Many of the parts of the system are identical or substantially the same as the parts used in the other forms of the invention previously described and the like parts have again been given like reference numbers.

The surface valve mechanism of this system differs from that of the system of Figure 12 in that a dart valve controlling a diaphragm motor is used to initially start the clock motor in place of the Bourdon tube. The dart valve is of the same construction as that shown in Figures 4 and 5.

Spaced at intervals along the well tubing are unloading valves 21 of the liquid float type the same as shown in Figure 1. The lowermost unloading valve 21, however, does not serve as a pilot valve as in Figure 1. Beneath the accumulation chamber 20 in a position similar to that occupied by main gas valve 70 of Figure 1 there is a main gas valve 200.

Referring to Figure 16 there is shown the internal construction of valve 200 which is contained within a housing 201. The housing 201 is divided into two compartments by a partition 202. A passage 203 through the partition 202 may be provided with a liquid check valve 203a similar to valve 148 of Figure 7. The passage is normally closed by valve member 204 resting against valve seat 205a. Valve member 204 is carried on valve stem 205 connected to the top end of sealed bellows 206. The bottom end of bellows 206 is connected to the bottom of valve housing 201. If desired the top of bellows 206 is provided with a plate 207 for cooperating with cage type guards 208 to limit compression of bellows 206 thereby preventing the bellows from being injured in case excessive pressures are present within the valve housing 201. The arrangement is similar to that of Figure 13 wherein stops 189a are provided for lower bellows 157. Such stops could also be used with the bellows actuating the gas valves of the previously described systems shown in Figures 1, 4, 7, and 9. They have the additional advantage of reducing wear of the bellows since without such stops the compressed position of the bellows varies as the annulus gas pressure goes up and down thereby continually expanding and contracting the bellows while with the stops the bellows moves against the stops and comes to rest. In addition, the open valve position is fixed so that the rate of gas flow is unaffected by changes in valve position once the valve has opened until it closes again.

Valve 204 is normally locked in closed position by means of hook 209 carried on stem 210 engaging beneath arm 211 on the side of valve stem 205. The stem 210 is connected at its opposite end to the top of bellows 211. The exterior of bellows 211 is exposed to the pressure in the upper chamber of valve housing 201, the upper chamber being connected by conduit 212 to the interior of the tubing 11. The interior of bellows 211 is exposed to the pressure in the lower part of valve housing 201 through port 213 in the partition 202. The bellows 211 completely surrounds the port 213 preventing communication therethrough between the upper and lower chambers of housing 201. The bellows 211 is urged downwardly by helical spring 214 connected to a plate 215 secured to the top of the bellows. The plate 215 also cooperates with stops 216 to limit the compression of bellows 211. The engagement of hook 209 on the bellows stem 210 with the arm 211 on the valve stem 205 and the sealing of valve member 204 against its seat 205a limits the expansion of the bellows.

The annulus gas is admitted to the lower chamber of valve housing 201 through port 218 and acts against the interior of bellows 211 expanding it against the action of the spring 214. The spring 214 is not strong enough to resist the annulus gas pressure so that the bellows 211 is normally expanded to its maximum degree with valve 205 closed.

The sealed bellows 206 contains gas under pressure, which pressure is slightly less than the normal annulus gas pressure so that were it not for the locking action of hook 209 against arm 211 the annulus gas pressure would open valve 204 by compressing bellows 206.

In operation of the system of Figure 15, when sufficient oil has built up past check valve 72 into the accumulation chamber 20 to fill the accumulation chamber the weight of the oil together with the force of spring 214 will be sufficient to overcome the force of the annulus gas on bellows 211 of the valve 200 and will move the hook 209 downwardly. This leaves the bellows 206 free to compress under the influence of the annulus gas pressure and open valve 204 admitting gas through passage 203 and conduit 212 to the tubing 11 beneath accumulation chamber 20. This will cause a drop in pressure in the annulus causing sufficient flow of gas in line 16 to actuate dart valve 105 of the surface valve mechanism. The dart valve 105 admits gas to the lower side of diaphragm 102 which pushes upwardly on stem 196 starting clock motor 195. This will turn cam 193 from the rest position shown in Figure 15 to a position where the high part of the cam will press against the upper end of the stem of valve 190 pivoting it about point 191 and opening port 42. This will reduce the pressure transmitted through conduit 34 to the upper surface of diaphragm 32 and allow spring 33 to open motor valve 30. Gas will then be admitted to the casing annulus at a higher rate than it is exhausted through subsurface valve 200 to the tubing so that annulus gas pressure will rise. When the oil rises in the tubing 11 it leaves the valve 200 but is replaced by gas which maintains the bellows 211 compressed, thereby keeping valve 204 open. The gas pressure will be higher than the hydrostatic pressure of the oil but injury to the bellows is prevented by stops 116 against which the bellows comes to rest. After a predetermined time clock motor 195 will have driven cam 193 to a position where it permits spring 192 to close valve 190 thus preventing exhaust of air from hollow body 10 through port 42. This will increase the pressure transmitted through conduit 34 to the upper surface of diaphragm 32 and close motor valve 30. The annulus gas pressure will then start to fall. When the annulus gas pressure falls below the normal pressure at which the cycle began and to a pressure below that within bellows 206 the bellows 206 will expand closing valve 204. It should be noted here that the annulus gas pressure at which valve 204 closes is below that necessary to actuate the surface controls for otherwise the valve would close again before the surface controls were actuated. After valve 204 closes the gas still in the tubing expands, expelling the oil from the top of the well. The drop in gas pressure in the tubing when the oil has been expelled permits the bellows 211 to expand again thus locking valve 204 in closed position. Closure of valve 204 stops the flow of gas in line 16 through valve 30 permitting the dart valve 105 to close, ready for the next cycle of operation. By-pass 60 of the surface valve mechanism permits gas to enter the annulus at a slow rate until the annulus gas pressure returns to the normal or starting pressure. The cycle is then complete.

Referring to Figure 17 which shows a graph of the pressure time relations in the casing annulus during a cycle, the normal annulus pressure is indicated at a. At point b the subsurface valve 200 opens and the gas pressure drops until point c is reached at which the surface gas valve 30 opens. The annulus gas pressure then rises until at point d the surface gas valve 30 closes. The gas pressure then falls to point e at which the subsurface gas valve 200 closes. The annulus is then gradually pressured back up to normal where at point f the by-pass valve of the surface valve mechanism closes.

In Figure 18 there is shown a modified form of the system of Figure 15 which also operates on the second described cycle. The surface valve mechanism is similar to that of Figure 1 in that changes in the annulus pressure are relied upon to both open and close the main surface gas valve. However, because in the second described cycle the annulus pressure drops below normal at the end of the cycle to a pressure lower than that required to actuate the surface controls, a mechanism is provided which causes the surface controls to open and close the main surface gas valve only on every other fall and rise of the annulus gas pressure.

Referring to the drawing there is bellows 259 disposed in a chamber 260 connected by conduit 47 to the gas supply line 16 on the down stream side of the main gas valve 30. The bellows contains adjustable compression spring 261 which tends to expand the bellows. Bellows 259 is connected to one end of stem 262 which is connected at its other end to a leaf spring 262a which has upper and lower arms 262b and 262c extending at right angles therefrom and a pin 262d on its extremity.

When bellows 259 reciprocates stem 262 the arms 262b and 262c of the leaf spring 262a are in position normally to abut against pin 263 formed by an extension of the central pivot of toggle linkage 264 and causes the toggle to travel between an upper position resting against stop 265a and a lower position resting against stop 265b. However, as shown in Figure 19 at a, on upward travel of the bellows stem sufficient to cause arm 262c to abut against pin 263 and move the toggle upwards, the pin 262d on the extremity of the leaf spring will have passed above pivoted bell crank lever 266. Lever 266 has a limited travel clockwise so that when the bellows stem 262 moves down again the pin 262d slides down the top side of lever 266 carrying the leaf spring 262a to the left. When the pin 262d is lowered past the pivot point of the lever 266 it slips over to guide rail 267 as shown at b in Figure 19. Further lowering of the pin 262d permits it to slip off the bottom of guide rail 267 onto guide rail 268 as shown at c in Figure 19. Upward travel of pin 262d will then follow guide rail 268 until the pin 262d slips over the top of the guide rail 268 and returns to its normal line of travel as shown in Figure 18. All the time the pin 262d is traveling on guide rails 267 and 268 the leaf spring 262a will be bent to the left far enough to bring the line of travel of arms 262b and 262c out of contact with pin 263 so that the toggle 264 is not actuated.

In its upper rest position toggle 264 is bent sufficiently so that the rod 269 connected thereto is out of contact with the top end of flapper valve 190 as shown in the drawing, Figure 18. In its lower rest position the toggle 264 is straight so that rod 269 is moved through its bearing 269a to the right sufficient to open the flapper valve 190.

The subsurface construction of Figure 18 differs from that of all the preceding embodiments of the invention in that the accumulation chamber is of the same diameter as the rest of the tubing, being constituted by that part of the tubing above the subsurface gas valve up to the level in the tubing to which the oil must rise to open the subsurface gas valve. This construction may be used wherever the bottom hole pressure of the oil is sufficiently high. Such an arrangement may be a positive requirement where the diameter of the hole has been reduced to a point where a large diameter accumulation chamber cannot be accommodated. For example, in Figure 18 a liner or lower casing 225 of smaller diameter than the upper casing 10 has been set inside the casing 10 in the lower part of the well hole, being sealed to the casing at 226.

In the system of Figure 18, since the accumulation chamber is of the same diameter as the rest of the tubing a removable valve construction can be used even though the valve is located at the bottom of the accumulation chamber. The valve is mounted inside the tubing in a slightly enlarged section 227 similar to the enlarged section 131 of Figure 7. Receiver 228 is supported within the tubing section 227 by means of suitable struts not shown and the interior of the receiver is in communication with the exterior of the tubing through pipe 229.

As best shown in Figure 20 the subsurface gas valve 230 is disposed within a housing 231 which is divided into two chambers by a partition 232. There is a port 233 in the partition 232. Mounted on opposite sides of the partition 232 and surrounding the port 233 are upper bellows 234 and lower bellows 235 which together form a double bellows similar to that used in the constructions of Figures 7 and 9. The ends of the bellows in contact with partition 232 are sealed therewith and the opposite ends of the bellows are closed. The top of the upper bellows is connected to valve stem 236 carrying valve member 237 which normally rests against valve seat 238 closing passage 239 between the upper chamber of housing 231 and the exterior. A ball and cage check valve 240 may be provided in the passage 239 to prevent flow of fluid downwardly in passage 239. A knob 241 which may be grasped by a fishing tool is disposed on the top of the housing 231 by means of struts 242 which provide a space for the passage of fluid beneath the knob from the passage 239.

The lower bellows 235 is connected by stem 243 to the top of sealed bellows 244. The bottom of bellows 244 is secured to the valve housing 231 just above the tapered bottom portion. The area of the top of bellows 244 is larger than the area of the bottom of bellows 235, preferably being about twice as large. Both the bellows 244 and the double bellows 234—235 contain gas under pressure. Assuming the area of the top of bellows 244 to be twice the area of bellows 235 the internal pressure of bellows 244 should be somewhat greater than half the internal pressure of the double bellows, the force exerted upwardly on stem 243 by bellows 244 will then be greater than the downward force exerted by bellows 235 and the bellows 235 will be compressed until the plate 245 secured to the bottom of bellows 235 abuts against the stops 246. The internal pressure of the double bellows should then be slightly greater than the annulus gas pressure admitted to the upper chamber of valve housing 231 through passage 239 and port 247 so that the valve member 237 will close the gas outlet passage 239.

The ring shaped seals 248 and 249 similar to the seals 136, 137 and 138 shown in Figure 7 serve both to support the valve housing 231 within the receiver 227 and to divide the annular space therebetween into an upper gas passage and a lower oil passage. Oil is admitted to the lower chamber of valve housing 231 through openings 251 in the bottom of the receiver 228 and thence through ports 250 in the bottom of the valve housing and ports 252 in the side thereof. Ports 253 through plate 254 on which bellows 244 is mounted provide passages for the flow of oil so that solid material will not build up around the bellows 244 but will be washed away. The seal 249 is above the level of port 252 and below the level of port 247. The seal 248 is above the level of ports 247 and pipe 229.

In operation of the system of Figure 18 oil will rise past the subsurface valve mechanism 230 into the tubing until a predetermined height has been reached sufficient to overcome the upward force exerted by differential bellows 244 against the lower bellows 235. The differential bellows 244 will then contract and the lower bellows 235 will expand. This will cause a drop in the internal pressure of the double bellows 234 and 235 below the annulus gas pressure which acts on the outside of the upper bellows 234 causing it to contract and moving valve member 237 downwardly to open the gas passage 239. Gas will then flow from the annulus through passage 229, port 247 and passage 239 into the tubing and start to lift the oil. At the same time the pressure in the tubing will be increased due to the gas so that differential bellows 244 will be further collapsed until plate 255 on the top thereof comes to rest against stops 256. As soon as gas begins to exhaust from the casing the surface valve mechanism comes into operation. The bellows 259 will expand until the arm 262b moves the toggle 264 to its lower straight position in which the rod 269 opens flapper valve 190 thereby reducing the gas pressure transmitted through conduit 34 to the upper surface of diaphragm 32 permitting spring 33 to open motor valve 30. As soon as motor valve 30 opens the gas pressure in the annulus starts to rise since gas is admitted to the annulus through valve 30 at a higher rate than it is admitted to the tubing through valve 230. A plate 257 cooperating with stops 258 may be provided if desired to limit the compression of the upper bellows 234, the same as in the Figure 16 system in which plate 207 and stops 208 limit the compression of the gas pressure responsive bellows 206. Alternatively the stops may be omited as in the constructions of Figures 7 and 9.

When the annulus pressure has risen to a a point sufficiently high to compress bellows 259 to a point where toggle 264 is moved up again, the valve 30 will again be closed and the annulus pressure will start to fall. When the annulus pressure reaches the original starting pressure the subsurface valve will still remain open because the internal pressure of the double bellows is less than its original pressure due to the expansion of the lower bellows. The annulus pressure will continue to drop until it is slightly below the internal pressure of the double bellows, at which point the upper bellows will expand and valve 230 will close. The gas in the tubing will continue to expand until the oil is expelled from the well at the surface. The gas pressure in the tubing will then drop substantially to atmospheric pressure, differential bellows 244 will expand and lower bellows 235 will contract restoring the subsurface valve mechanism to its original starting condition. The annulus will gradually be brought back to the starting pressure by means of gas admitted to the by-pass line 60 of the surface valve mechanism, at which point the pressure regulator 61 will close. The surface controls will not be reactuated during the fall and rise of annulus pressure on the latter half of the cycle because the leaf spring 262a will be held to the left, out of its operative line of travel, by the pin 262d moving along guide rails 267 and 268.

Figure 21 is a graph showing the variations in annulus pressure plotted against time for the system shown in Figure 18. It will be seen that the cycle of annulus pressure is substantially the same as the cycle for the system of Figure 15 shown in Figure 17. The principal difference lies in the fact that there is a slightly greater pressure drop from b to c required for opening of the surface gas valve 30 since the dart valve is more sensitive than the bellows. For this reason it is necessary that the required drop in annulus pressure below the starting pressure necessary to close the subsurface gas valve be slightly greater in the system of Figure 18 than in the Figure 15 system. In other words, the point e corresponds to a lower pressure in Figure 21 than in Figure 17. The closing annulus pressure depends on the internal pressure of the double bellows at the time prior to closing which is determined by the position of the stops 254 which limit the expansion of the lower bellows. In both systems it is necessary that the pressure at point e be below the pressure corresponding to point c in order that the surface valve mechanism be actuated before the pressure drops sufficiently to re-close the subsurface valve. Since the pressure at point e is lower in the system of Figure 18 the re-pressuring of the annulus corresponding to line e—f of the graph is of slightly longer duration in the Figure 18 system than in the Figure 15 system. These slight disadvantages of the surface controls of the Figure 18 system are, however, more than offset by the more positive action of the simple pressure responsive controls compared with the dart valve actuated controls.

Referring to Figure 22 there is shown a system according to the invention operating on the third described cycle. The surface valve mechanism is quite similar to the mechanism shown in Figure 1 except that the mechanism is not of the snap action type. Instead, contraction of the Bourdon tube 45 acts directly through adjustable length link 270 to turn bell crank lever 271 clockwise about its fixed pivot 272 thereby raising adjustable position pin 273. This allows helical spring 274 to raise needle valve 275. As needle valve 275 is raised it opens a little wider admitting more gas through conduit 34 to the top of bellows 32 of the motor valve 90. This moves valve stem 31 downwardly to open valve 90. The subsurface arrangement is quite similar to that shown in Figure 4 comprising pressure actuated unloading valves 125 and accumulation chamber 20 having a macaroni string 119 therein and a bottom hole construction comprising a liner 115 and screen 17 with a ball and cage type check valve 72 disposed just below the accumulation chamber. The packer 19 is shown below the accumulation chamber rather than above, as in Figure 4. The packer could, however, be mounted above the accumulation chamber if desired, the requirement being only that the packer be below the gas inlet to the subsurface gas valve.

The subsurface valve mechanism 300 is of the single valve removable type as distinguished from the two valve non-removable apparatus of Figure 4. The valve is supported in a receiver 301 supported in tubing section 302 of slightly larger diameter than the remainder of the tubing string by means of suitable struts and braces not shown. The valve actuating mechanism 300 is disposed within a housing 303 which is supported within the receiver by means of ring shaped seals 304, 305 and 306 which divide the annular space between the receiver 301 and housing 303 into three chambers. Gas is admitted from the tubing-casing annulus to the space between the valve housing above the seal 305 through pipe 307 and is allowed to leave the space around the valve housing between the seals 305 and 306 by means of a pipe 308 which carries the gas to the top of the accumulation chamber 20.

The details of the subsurface valve mechanism 300 are best shown in Figure 23. The valve housing 303 is divided into three compartments by means of partitions 309 and 310. There is a passage 311 through the center of partition 309. Upper bellows 312 and lower bellows 313 are mounted respectively above and below the partition 309 around the opening 311 forming a double bellows similar to those shown in Figures 7 and 16. A passage 314 through partition 310 is normally closed by valve member 315 which rests against valve seat 316. Valve member 315 is carried on one end of valve stem 317 which is connected to the bottom end of lower bellows 313. The valve member 315 is opened by expansion of the lower bellows 313 which distinguishes its operations from the other subsurface valve mechanisms of the single valve type previously described.

The top of the upper bellows 312 is provided with a plate 318 adapted to bear against upper stops 319a and lower stops 319b to limit the travel of the bellows. A helical spring 320 tends to contract the upper bellows 312 which is exposed to the pressure existing in the tubing 11 by means of ports 321 in the top of the valve housing 303. A knob 322 is provided on the top of the valve housing 303 suitable for engagement with a fishing tool.

The lower bellows 313 is exposed to the annulus gas pressure by means of a port 323 in the side of the valve housing. This port opens into the annular space between the valve housing and the receiver below the seal 304 and above the seal 305, the space being in communication with the casing annulus through the pipe 307. When the valve 315 is open gas in the space around the lower bellows 313 will escape into the chamber in the valve housing below the partition 310 and pass through port 324 into the space between the valve housing and receiver below the seal 305 and above the seal 306 from which space it will pass by means of pipe 308 to the accumulation chamber 20. The seal 306 is provided so that the gas cannot escape through holes 325 and the bottom of the receiver 301 which are provided so that oil can easily drain out of the receiver when the valve is first installed.

The internal pressure of the double bellows 312—313 is normally slightly less than the annulus gas pressure so that the lower bellows is compressed until the valve member 315 rests on seat 316. The tension of spring 320 is insufficient to overcome the internal pressure of the double bellows so the upper bellows 312 is expanded until plate 318 rests against upper stops 319a.

In operation of the system shown in Figure 22 oil will rise in the tubing through the check valve 72 into the accumulation chamber 20 and macaroni string 119 and thus into the enlarged tubing section 302. When the oil has risen sufficiently high above valve mechanism 300 the weight of the oil will be sufficient to compress the upper bellows 312 with the aid of the spring 320. This will cause the internal pressure of the double bellows 312—313 to increase thereby expanding the lower bellows 313 against the annulus gas pressure and cause valve member 315 to move to open position. Gas will then be admitted from the annulus through passage 307, port 323, passage 314, port 324, and pipe 308 into the top of the accumulation chamber 20. The gas will force the oil down in the accumulation chamber and up through the macaroni string 119 into the tubing 11. When the gas has carried the oil above the level of valve mechanism 300 the gas pressure will act on the upper bellows 312 to compress it further until the plate 318 rests on the lower stops 319b. Gas will continue to be admitted to the tubing and lift the oil and the annulus gas pressure will continue to drop. If desired there may be provided a plate 326 on the lower bellows 313 co-operating with stops 327 to limit the expansion of the lower bellows. When the pressure has dropped to a considerable extent, much lower than the drop in pressure in the previously described systems, the Bourdon tube 45 of the surface valve mechanism will contract and operate to open the motor valve 90. This will admit gas to the annulus at a higher rate than it is being exhausted to the tubing through the subsurface valve so that the annulus gas pressure will start to rise. When the annulus gas pressure has risen a predetermined small amount above the starting annulus gas pressure it will compress the lower bellows 313 of the subsurface valve despite the increased internal pressure of the double bellows 312—313 due to compression of the upper bellows 312. Compression of the lower bellows 313 will close the valve member 315 and shut off flow of gas to the tubing. The gas pressure will continue to rise until it reaches a slightly higher value sufficient to expand the Bourdon tube 45 of the surface valve mechanism which will operate to close motor valve 90. The annulus will then gradually be brought back to its original starting pressure by means of gas exhausting through bleeder 330, pressure regulator 321, and needle valve 332 to the low pressure side of the gas supply system. In the meantime the gas remaining in the tube will expand, lifting the oil and expelling it from the well at the surface.

Referring to Figure 24 there is shown a graph of the variations in annulus gas pressure plotted against time. The normal pressure of the annulus corresponding to pressure existing between lift operations is indicated at $a$. At point $b$ the subsurface gas valve opens causing the pressure in the annulus to drop to point $c$ at which time the main surface gas valve opens. The pressure then rises until at point $d$ the subsurface valve closes. Thereafter the pressure rises sharply until the surface valve closes at $e$. The pressure then drops slowly until at $f$ the bleeder pressure regulator of the surface valve mechanism closes, the pressure at $f$ corresponding to that at $a$.

The system just described differs from the other systems of the invention in that a large quantity of the gas stored in the casing annulus is used to lift the oil before any gas is admitted to the casing annulus at the surface. The quantity of gas used is adjustable at the surface as in the previously described systems of the invention but this is done by adjusting the pressure drop in the annulus needed to open the surface controls rather than adjusting the pressure rise needed to close the surface controls as in the other systems. The actual adjustment can be made by varying the length of link 270 or changing the setting of pin 273. Since in the system shown in Figure 18 the gas pressure during the lift cycle does not greatly exceed the normal or rest pressure of the system the system is particularly adapted to the use of pressure type unloading valves since the pressures at which these operate need not be set so high above the normal annulus gas pressure.

In illustrating preferred embodiments of the invention six different types of surface valve mechanisms have been described in connection with eight different types of subsurface valve mechanisms. In addition, two different types of unloading valves have been shown and several types of accumulation chambers and bottom hole completions have been illustrated. Each of these elements has particular advantages in combination with other elements of the system but for the most part the various elements of one system are interchangeable with the corresponding elements of another. Thus, the six described controls for the main surface gas valve may be briefly described as being of the straight pressure type shown in Figures 1, 18 and 22; kinetic-pressure type shown in Figure 4; the pressure-time type shown in Figure 12 and the kinetic-time type shown in Figure 15. Any of these surface controls can be used with any of the systems operating on the first described cycle. For such use the pressure type control of Figure 18 would be modified to eliminate the guide rails that render the mechanism unresponsive on every other fall and rise of pressure. For use with the systems operating on the second described cycle both the kinetic-time and kinetic-pressure controls are suitable as well as the pressure control shown in Figure 18. The other pressure controls would also be suitable if modified to make every other run a dummy run. The pressure-clock control would also be suitable if similarly modified. The system shown in Figure 22 requires a straight pressure responsive device for opening the main surface gas valve after a considerable pressure drop and also for closing the main surface gas valve to insure that it does not close until the pressure has risen sufficiently to close the subsurface valve. For this reason the kinetic-pressure, kinetic-time, and pressure-time types of controls are not suitable for use with the Figure 22 system although if sufficient time were allowed to insure an adequate rise in annulus gas pressure the pressure-time control system could conceivably be used even in the Figure 22 system.

In systems using buoyancy actuated controls for opening the subsurface gas valve whether in the one or two valve type of subsurface valve mechanism, the buoyancy member must be located at the level of the top of the oil when a full head of oil has accumulated. On the other hand in systems using pressure actuated means for opening the subsurface gas valve the pressure actuated means can be located at any point below the level of the top of the oil corresponding to a full head. When the two valve subsurface valve mechanism is used the pilot valve which is of the buoyancy operated type can be located at a different level from that at which the main pressure actuated subsurface gas valve is located so that the two valve subsurface valve actuating mechanism can be used with either a plain accumulation chamber or accumulation chamber of the type incorporating the macaroni string although unless the macaroni string type of chamber is used the gas from the pilot valve will have to be wasted, the only alternative being to provide an extremely long gas tube on the pilot valve extending the full length of the accumulation chamber. With a single valve type of subsurface valve mechanism the accumulation chamber using a macaroni string must be used if a buoyancy operated valve is used, again the alternative being the provision of an extremely long gas tube extending from the buoyancy operated valve to the bottom of the accumulation chamber. If a pressure operated subsurface valve of the single valve type is used it may be placed at any level below the level of the oil when a full head has accumulated, but if oversized tubing is used to form the accumulation chamber and no macaroni string is used the valve cannot easily be made of the removable type because of the difficulty of fishing through the large diameter of the accumulation chamber.

In the various systems according to the invention that have been described, a variety of bellows and bellows combinations have been shown. It is desirable in actual practice to provide cylindrical guides around the bellows to prevent them from buckling. This is particularly true where high pressures are used. The guide cylinders can serve also as stops to limit the bellows travel on compression. Preferably the guides should be perforated to prevent accumulation of sand and dirt around the bellows and to keep the bellows exterior in communication with the fluid pressure to which it is to be responsive.

In the various systems described a number of the bellows stops have been stated to be required while others have been stated to be optional. Generally speaking the bellows responsive to annulus gas pressure to which the subsurface gas valve is directly connected must normally be under a pressure differential maintaining the valve closed. The valve and its seat in this case serve as stop means to limit the bellows travel in the one direction. Stop means to limit the travel of the gas responsive bellows in the valve opening direction is not a requisite and has not been shown in the valves of Figures 2, 7 and 9. However, such stop means is desirable as was pointed out in describing the valve shown in Figure 16 and such stops are also shown in Figures 13, 19 and 23.

The bellows responsive to oil pressure requires stops to care for the normal differential between the pressures on opposite sides thereof. Such a differential is necessary in order that the subsurface gas valve be positively closed until the desired amount of oil has accumulated. Thus, in the systems of Figures 7, 9, 13 and 20 where the oil causes expansion of the oil responsive bellows, the internal pressure of the oil responsive bellows is more than balanced by a differential weight, spring or auxiliary bellows while in the systems of Figures 16 and 23 where the oil causes contraction of the oil responsive bellows the differential spring is insufficient to balance the internal pressure of the bellows.

The bellows responsive to oil pressure in most cases also requires stops to limit its travel on being subjected to gas pressure when the subsurface gas valve opens. In the systems of Figures 9, 7 and 13 the same stops which took care of the normal differential on the oil responsive bellows when the gas valve is closed serve to limit the travel of the oil responsive bellows when the valve is open and prevent the gas pressure in the tubing from closing the valve prematurely. In the systems of Figures 20 and 23 separate stops are used since the gas pressure in the tubing acts in the opposite direction to the normal differential on the oil responsive bellows. In these systems the stops are needed to permit the gas valve to be closed again at the proper time by a change in gas pressure for otherwise a change in gas pressure to act on the gas responsive bellows would also cause a movement of the oil responsive bellows which would change the internal pressure of the double bellows in opposition to the action on the gas responsive bellows.

In the system of Figure 16 no stops are required on the oil responsive bellows other than those necessary to care for the normal differential when the valve is closed, the gas valve and its seat serving this purpose. However as stated previously in describing the system of Figure 13, such stops are desirable to prevent injury to the oil responsive bellows. The effect of stopping reaction on the gas responsive bellows due to changes in the gas pressure acting on the oil responsive bellows is in this system accomplished by the break joint provided by hook 209 and arm 210.

In the various systems shown in Figures 7, 9, 13, 20 and 23 using a single valve subsurface valve mechanism employing a double bellows the oil responsive bellows is shown as of greater length than the gas responsive bellows. This is because the internal pressure of the double bellows must be changed initially a considerable amount before the differential holding the gas valve closed is balanced and thereafter must be changed further to open the valve fully. Thus, the travel of the oil responsive bellows which causes the change of internal pressure of the double bellows must be greater than the travel of the gas responsive bellows which moves the valve. Since the maximum travel of a bellows is roughly proportional to its length it is economical to make the gas pressure responsive bellows of shorter length than the oil responsive bellows because it need not have as great a travel.

The upper and lower bellows comprising each double bellows have also in each case been shown as of the same diameter. This was done primarily because in a valve placed in an oil well there is very little room and the bellows have in all cases been made as large as possible. However it is not necessary that the two halves of the double bellows be of equal diameter and in some cases it is desirable to make them of different diameters. For example, if the oil responsive half is made of smaller diameter the spring or weight or differential bellows required to hold it against the internal double bellows pressure need not exert as great a force and in the case of buoyancy operated systems the buoyancy member need not exert as great a force when the upper bellows is of smaller diameter than the lower bellows, to create an equal internal double bellows pressure change upon build up of a given amount of oil to the change produced with a larger diameter upper bellows, it is only necessary to make the upper bellows travel greater. If the gas responsive bellows is made of smaller diameter than the oil responsive bellows the effect is the reverse of that just described.

While the quantity of gas admitted to the oil is adjustable from the surface in all of the systems according to the invention described above, it is necessary to fix the quantity of oil to be lifted in each cycle when the system is first installed. In the case of systems having buoyancy members to actuate the subsurface valve mechanism in response to the accumulation of the desired quantity of oil the level at which the buoyancy member is installed determines the height to which the oil must rise to start each cycle. The volume of oil lifted each cycle is determined by the volume of the accumulation chamber below the buoyancy member behind or beneath which gas is admitted by the subsurface main gas valve. In the case of systems having members responsive simply to the static pressure in the tubing to actuate the subsurface valve mechanism the head of oil above the pressure operated member required to operate it can be adjusted prior to installation by the use of springs and weights or by varying the gas pressures in the sealed bellows.

While a number of preferred embodiments of the invention have been shown and described it is obvious that many further modifications thereof can be made without departing from the spirit of the invention. It is intended to protect by Letters Patent all forms of the invention falling within the scope of the appended claims.

I claim:

1. The method of producing oil from a well comprising admitting gas to the oil behind a predetermined quantity of the oil when said predetermined quantity has accumulated in the well and shutting off the gas prior to the expulsion of any of the oil from the well when a predetermined quantity of the gas has been admitted to the oil just sufficient to lift said predetermined quantity of oil to the surface of the well.

2. A gas lift system for an oil well comprising a casing extending from the top of the well at least to the level of the oil producing formation, a concentric tubing extending from the top of the well at least to a level below that to which the oil will rise in the casing under its natural pressure, a packer sealing between the casing and tubing at a level below the level to which the oil will rise in the tubing under its natural pressure, pipe means adapted to connect the casing annulus to a source of gas under pressure, first valve means controlling gas flow through said pipe means, second means including a valve to place that portion of the casing annulus above the packer in communication with the tubing at a level below that to which the oil will rise in the tubing under its natural pressure, the second means being responsive to accumulation in the tubing of a predetermined head of oil to open said communication, the first valve means responding upon said opening of communication to open said pipe means to gas flow therethrough until a predetermined quantity of gas has been admitted to the casing annulus, said second valve means responding to a predetermined change in pressure in the annulus to close said communication, and a check valve in the tubing below the level at which gas is admitted thereto from said annulus to prevent the downward flow of fluid in the tubing therebelow.

3. A double bellows comprising means for separating a space into two chambers including a support having an aperture therethrough, a first bellows having its open end secured to one side of the support around the aperture and its closed end disposed to said one side of the support, a second bellows having its open end secured to the support on the other side from said first bellows and around said aperture and its closed end disposed on said other side, said closed ends being free of any rigid connection between them and relatively movable with respect to each other.

4. A valve actuating device comprising means for separating a space into two chambers including a support having an aperture therethrough, a first bellows having its open end secured to one side of the support around the aperture and its closed end disposed to said one side of the support, a second bellows having its open end secured to the support on the other side from said first bellows and around said aperture and its closed end disposed on said other side, said closed ends being free of any rigid connection between them and movable relative to each other and relative to said support, gas at above atmospheric pressure inside said bellows and a valve connected to the closed end of one of said bellows.

5. A gas lift system for a well comprising means forming induction and eduction fluid passages from the earth's surface down to the producing formation, a source of gas under pressure, first means to provide communication between said source and the induction passage means adjacent the surface, second means to provide communication between said induction and eduction fluid passage means adjacent said formation, first valve means controlling fluid flow through said first communication means, second valve means controlling fluid flow through said second communication means, said second valve means comprising means responsive to the accumulation of a predetermined quantity of well fluid in the eduction passage means to initiate opening of said second valve means, said first valve means comprising means responsive to changes in the condition of the gas in the induction passage means produced by opening of said second valve means to open said first valve means, each of said valve means also including means responsive to change of pressure in the induction passage means cooperating to close the respective valve means after a predetermined quantity of gas has been admitted to each of said induction and eduction passage means.

6. A gas lift system for a well comprising means forming induction and eduction fluid passages from the earth's surface down to the producing formation, a source of gas under pressure, first means to provide communication between said source and the induction passage means adjacent the surface, second means to provide communication between said induction and eduction fluid passage means adjacent said formation, first valve means controlling fluid flow through said first communication means, second valve means controlling fluid flow through said second communication means, said second valve means comprising actuating means responsive to the accumulation of a predetermined quantity of well fluid in the eduction passage means to open said second valve means, said first valve means comprising actuating means responsive to changes in the condition of the gas in the induction passage means produced by opening of said second valve means to open said first valve means until a predetermined quantity of gas has been admitted to said induction passage means and thereafter to close said first valve means, said actuating means for said second valve means being responsive to a predetermined change in pressure in said induction passage means to close said second valve means.

7. The combination of claim 6 in which said actuating means for said second valve means includes two sensitive means, one of which causes said response to accumulation of well fluid to open said second means upon accumulation of said predetermined quantity of well fluid in said eduction passage means adjacent said one sensitive means and the second of which causes said response to change in pressure in said induction passage means to close said second valve means, said response of said second valve means to accumulation of well fluid adjacent said one sensitive means being impositive and the response of said second valve means to change in pressure in said eduction passage means tending to open said second valve means being at least limited.

8. A gas lift system for a well comprising means forming induction and eduction fluid passages from the earth's surface down to the producing formation, a source of gas under pressure, first means to provide communication between said source and the induction passage means adjacent the surface, second means to provide communication between said induction and eduction passage means adjacent said formation, first valve means controlling fluid flow through said first communication means, second valve means controlling fluid flow through said second communication means, said second valve means comprising actuating means responsive to the accumulation of a predetermined quantity of well fluid in the eduction passage means to open said second valve means, said first valve means comprising actuating means responsive to a predetermined change in the condition of the gas in the induction passage means produced by opening of said second valve means to open said first valve means, said actuating means for said first valve means being actuated upon the admission of a predetermined quantity of gas to the induction passage means to close said first valve means, said actuating means for the second valve means also being responsive to drop of pressure in the induction passage means to a predetermined point produced by closure of said first valve means to close said second valve means after a predetermined quantity of gas has been admitted to the eduction passage means.

9. The combination of claim 8 in which said actuating means for said second valve means includes two sensitive means, one of which causes said response to accumulation of well fluid to open said second valve means upon accumulation of said predetermined quantity of well fluid in said eduction passage means adjacent said one sensitive member and the second of which causes said response to drop of pressure in the induction passage means to close said second valve means, said response of said second valve means to accumulation of well fluid adjacent said one sensitive means being impositive and the response of said second valve means to rise in pressure in said eduction passage means tending to open said second valve means being at least limited.

10. The combination of claim 8 in which the pressure in the induction passage means at which said second valve means closes is the same as the pressure in the induction passage means existing just prior to opening of said second valve means.

11. The combination of claim 10 in which said second valve means comprises a main valve means and a pilot valve means, said actuating means for the second valve means includes two sensitive means, one of said sensitive means responds to the buoyant effect thereon produced by said accumulation of a predetermined quantity of well fluid in the eduction passage means adjacent said one sensitive member to cause said pilot valve means to open thereby causing said change in condition of the gas in the induction passage means which causes said first valve means to open, the second of said sensitive means responds to rise in pressure in said induction passage means produced by said opening of said first valve means to open said main valve means and thereby complete said opening of said second valve means, said one sensitive means responds to removal of said well fluid from adjacent said one sensitive means to close said pilot valve, and said second sensitive means responds to said drop in pressure in said induction passage means to said predetermined point to close said main valve means and thereby complete said closure of said second valve means.

12. In combination with the apparatus of claim 11, a plurality of means providing communication between said induction and eduction passage means, the last said means being spaced apart at different levels along the length of said eduction passage and all at levels above the first said means providing communication between said induction and eduction fluid passage means, a plurality of means to control the flow of fluid through said plurality of communication means, each of said control means responding to the buoyant effect thereon produced by the presence and absence of oil in the adjacent part of the eduction passage means to open and close said control means.

13. The combination of claim 10 in which said actuating means for said second valve means includes two sensitive means, the second of said sensitive means responds to changes in the difference in pressure on opposite sides thereof to cause said second valve means to be opened and closed, one side of said second sensitive means being subject to the pressure in said induction passage means, decrease of the last said pressure tending to close said second valve means and producing said response of said actuating means for the second valve means to drop in pressure in the eduction passage means to said predetermined point acting to close said second valve means, the first of said sensitive means responds to the difference in pressures on opposite sides thereof to cause the pressure on the other side of said second sensitive means to change, there being an elastic medium of low force to deformation ratio between said other side of the second sensitive means and one side of said first sensitive means, and said actuating means for the second valve means also includes a biasing means normally exerting a pressure on the other side of said first sensitive means, said biasing means being actuated in response to the buoyant effect of the well fluid on said biasing means when said predetermined quantity of well fluid has accumulated in said eduction passage means to reduce the pressure of said biasing means on said other side of said first sensitive means to thereby change the differential pressure on the second sensitive means to open said second valve means, the response of said first sensitive means to increase of pressure on said other side thereof being limited.

14. The combination of claim 10 in which said actuating means for said second valve means includes two sensitive means, the second of said sensitive means responds to changes in the difference in pressure on opposite sides thereof to cause said second valve mean to be opened and closed, one side of said second sensitive means being subjected to the pressure in said induction passage means, decrease of the last said pressure tending to close said second valve means and producing said response of said actuating means for the second valve means to drop in pressure in the eduction passage means to said predetermined point acting to close said second valve means, the first of said sensitive means responds to the difference in pressure on opposite sides thereof to cause the pressure on the other side of said second sensitive means to change, there being an elastic medium of low force to deformation ratio between said other side of the second sensitive means and one side of said first sensitive means, and said actuating means for the second valve means also includes a biasing means normally exerting a pressure on the other side of said first sensitive means, said biasing means being actuated in response to increase in the pressure in said eduction passage means thereon including such pressure increase as occurs upon said accumulation of said predetermined quantity of well fluid in said eduction passage means to reduce the pressure of said biasing means on said other side of said first sensitive mean to thereby change the differential pressure on the second sensitive means to open said second valve means, said biasing means responding to sufficient increase in pressure in said eduction passage means to completely eliminate the pressure of said biasing means on said second sensitive means, said biasing means being unresponsive to further increase in pressure in said eduction passage means to produce any reversed pressure from said biasing means on said first sensitive means, the response of said first sensitive means to increase of pressure on said other side thereof being limited.

15. The combination of claim 8 in which the pressure in the induction passage means at which said second valve mechanism closes is below the initial pressure in the induction passage means existing just prior to opening of said second valve means, and said first valve means includes means responsive to the pressure in the induction passage means to place said source of supply in restricted communication with said induction passage means when the pressure in the induction passage means is below said initial pressure.

16. The combination of claim 15 in which said actuating means for said second valve means includes two sensitive means, the second of said sensitive means responding to changes in pressure in said induction passage means to tend to open and close said second valve means and producing said response of said actuating means for the second valve means to drop in pressure in the eduction passage means to said predetermined point acting to close said second valve means, the first of said sensitive means normally exerting a force holding said second valve means closed but responding to increase of pressure in said eduction passage means including such pressure increase as occurs upon said accumulation of said predetermined quantity of well fluid in said eduction passage means to move to a position in which said second valve means is independent of said first sensitive means.

17. The combination of claim 15 in which said actuating means for said second valve means includes two sensitive means, the second of said sensitive means responds to change in the difference in pressure on opposite sides thereof to cause said second valve means to be opend and closed, one side of said second sensitive means being subjected to the pressure in said induction passage means, decrease of the last said pressure tending to close said second valve means and producing said response of said actuating means for the second valve means to drop in pressure in the eduction passage means to said predetermined point acting to close said second valve means, the first of said sensitive means responds to the difference in pressures on opposite sides thereof to cause the pressure on the other side of said second sensitive means to change, there being an elastic medium of low force to deformation ratio between said other side of the second sensitive means and one side of said first sensitive means, and said actuating means for the second valve means also includes a biasing means normally exerting a pressure on the other side of said first sensitive means, said biasing means being actuated in response to increase in the pressure in said eduction passage means thereon including such pressure increase as occurs upon said accumulation of said predetermined quantity of well fluid in said eduction passage means to reduce the pressure of said biasing means on said other side of said first sensitive means to thereby change the differential pressure on the second sensitive means to open said second valve means, said biasing means responding to sufficient increase in pressure in said eduction passage means to completely eliminate the pressure of said biasing means on said second sensitive means, said biasing means being responsive to further increase in pressure in said eduction passage means to exert a force on said first sensitive means that is in an opposite direction to said normal pressure exerted by said biasing means, the response of said biasing means to said further increase in pressure in said eduction passage means being limited.

18. The combination of claim 15 in which said second valve means includes a movably mounted valve member, said member in one position thereof closing said second valve means and in other positions opening said second valve means to varying extents depending on the position of said valve member, said actuating means for said second valve means includes a double bellows, the end of one half of the double bellows being connected to said valve member to open said second valve means upon contraction of said one half, the exterior of said one half being exposed to the pressure in said induction passage means, the exterior of the other half of the double bellows being exposd to the pressure in said eduction passage means, stop means to limit the contraction of said other half of the double bellows, a second bellows of larger effective area than said other half of the double bellows, rigid means connecting the end of said bellows to the end of said other half of the double bellows, said second bellows tending to compress said other half of the double bellows, said double bellows containing gas at a pressure above atmospheric pressure, said second bellows also containing gas at a pressure above atmospheric pressure, said second bellows normally compressing said other half of the double bellows to the limit allowed by said stop means, said second bellows being exposed on its exterior to the pressure in said eduction passage means, said accumulation of a predetermined quantity of well fluid in the eduction passage means producing enough pressure to compress said second bellows and cause said other half of the double bellows to expand causing said one half of the double bellows to contract to move said valve means to open said second valve means, stop means to limit the expansion of said other half of the double bellows upon further increase of pressure in the eduction passage means, said one half being expanded upon decrease to said predetermined point of the pressure in the induction passage means to move said valve member to close said second valve means.

19. A gas lift system for a well comprising means forming induction and eduction fluid passages from the earth's surface down to the producing formation, a source of gas under pressure, first means to provide communication between said source and the induction passage means adjacent the surface, second means to provide communication between said induction and eduction fluid passage means adjacent said formation, first valve means controlling flow through said first communication means, second valve means controlling fluid flow through said second communication means, said second valve means comprising actuating means responsive to the accumulation of a predetermined quantity of well fluid in the eduction passage means to open said second valve means, said first valve means comprising actuating means responsive to a drop to a predetermined point of the pressure of the gas in the induction passage means produced by opening of said second valve means to open said first valve means, said actuating means for the second valve means also being responsive to a rise in pressure in the induction passage means to a predetermined point produced by opening of said first valve means to close said second valve means, said first valve means also being responsive to a further rise to a predetermined point of the pressure in said induction passage means following closure of said second valve means to close said first valve means.

20. The combination of claim 19 in which the pressure in the induction passage means at which said second valve means closes is above the initial pressure in the induction passage means existing just prior to opening of said second valve means, and said first valve means includes means responsive to the pressure in the induction passage means to place said induction passage means in restricted communication with a volume of a gas at a lower pressure than said initial pressure when the pressure in the induction passage means is above said initial pressure.

21. The combination of claim 20 in which said actuating means for said second valve means includes two sensitive means, the second of said sensitive means responds to changes in the difference in pressure on opposite sides thereof to cause said second valve means to be opened and closed, one side of said second sensitive means being responsive to the pressure in said induction passage means, decrease of the last said pressure tending to open said second valve means and producing said response of said actuating means for the second valve means to rise in pressure in the eduction passage means to said predetermined point to close said second valve means, the first of said sensitive means responds to the difference in pressures on opposite sides thereof to cause the pressure on the other side of said second sensitive means to change, there being an elastic medium of low force to deformation ratio between said other side of the second sensitive means and one side of said first sensitive means, the other side of said first sensitive means being responsive to the pressure in said eduction passage means and producing said response of said actuating means for the second valve means upon accumulation of a predetermined quantity of well fluid in the eduction passage means to open said second valve means, the response of said first sensitive element to further increase of pressure in said eduction passage means being limited.

22. The combination of claim 20 in which said second valve means includes a movably mounted valve member, said member in one position thereof closing said second valve means and in other positions opening said second valve means to varying extents depending on the position of said valve member, said actuating means for said second valve means includes a double bellows, the end of one half of the double bellows being connected to said valve member to open said second valve means upon expansion of said one half, the exterior of said one half being exposed to the pressure in said induction passage means, the exterior of the other half of the double bellows being exposed to the pressure in said eduction passage means, stop means to limit the expansion of said other half of the double bellows, a spring tending to compress said other half of the double bellows, said double bellows containing gas at a pressure above atmospheric pressure, said internal pressure being sufficient normally to overcome said spring and expand said other half of the double bellows to the limit allowed by said stop means but insufficient to resist the combined force of said spring and the external pressure on said other half of said double bellows upon accumulation of said predetermined quantity of well fluid in the eduction passage means, said combined force compressing said other half of the double bellows sufficiently to cause expansion of said one half to move said valve member to open said second valve means, second stop means to limit the compression of said other half of the double bellows upon further increase in the external pressure thereon, said one half being compressed upon increase to said predetermined point of the pressure in said induction passage means to move said valve member to close said second valve means.

23. In combination with the apparatus of claim 22, a plurality of means providing communication between said induction and eduction passage means, the last said means being spaced apart at different levels along the length of said eduction passage means and all at levels above the first said means providing communication between said induction and eduction means, a plurality of means to control the flow of fluid through said plurality of communication means, each of said control means opening and closing in response to the pressure in said induction passage means, the opening pressures of said control means being in descending order from the earth's surface downward, the opening pressure of the lowermost of said control means being above the pressure required to close said second valve means.

24. A gas lift system for a well comprising a casing, a concentric oil tubing, a plurality of unloading valves connected along the tubing at intervals all responsive to different degrees of the same set of well conditions to open and close, a subsurface valve means for admitting gas from the annulus between the casing and tubing to the tubing including an intermitter valve means responsive to well conditions including those to which respond said unloading valves to open said valve means upon accumulation of a predetermined quantity of well fluid in the tubing, a surface valve means to admit gas from a source of supply to said annulus, said surface valve means including means responsive to a change in the condition of the gas produced by opening of the subsurface valve means to open the surface valve means, each of said surface and subsurface valve means also including means responsive to change of pressure in the annulus cooperating to close the respective valve means after a predetermined quantity of gas has been admitted to the tubing and the annulus.

25. For use in an oil well having an induction passage means and an eduction passage means both extending from the earth's surface to the producing formation, an intermitter bottom hole valve comprising a support, a first bellows secured to the support at one end of the bellows, a second bellows secured to the support at one end of the second bellows, a wall carried by said support, a gas port through said wall, a valve member adapted to close said port, means connecting said valve member to the free end of said first bellows, means to connect one end of said gas port to such an induction passage means as aforesaid, means to connect the other end of said gas port to such an eduction passage means as aforesaid, means to place one side of said first bellows in communication with said induction passage means, means to place one side of said second bellows in communication with said eduction passage means, means to influence the movement of the free end of said first bellows in response to changes in pressure on said one side of said second bellows, said influencing means including the second bellows and means to affect the free end of said first bellows in response to movement of the free end of said second bellows, said influencing means being at least limited in its effect on the free end of said first bellows upon increase of pressure on said one side of said second bellows, said free end of the first bellows being free of any rigid connection to the free end of the second bellows, whereby said valve member can be moved to position to close said port independent of the position of said free end of said second bellows and the pressure on said second bellows.

26. For use in an oil well having an induction passage means and an eduction passage means both extending from the earth's surface to the producing formation, an intermitter bottom hole valve comprising a support, a first bellows secured to the support at one end of the bellows, a second bellows secured to the support at one end of the second bellows, a wall carried by said support, a gas port through said wall, a valve member adapted to close said port, means connecting said valve member to the free end of said first bellows, means to connect one end of said gas port to such an induction passage means as aforesaid, means to connect the other end of said gas port to such an eduction passage means as aforesaid, means to place one side of said first bellows in communication with said induction passage means, means to place one side of said second bellows in communication with said eduction passage means, means connected to the free end of the second bellows to block movement of the valve member away from port closing position when said free end of the second bellows is in one position, said valve member being free of said blocking means when said free end of the second bellows is in another position, said free end of the first bellows being free of any rigid connection to the free end of the second bellows, whereby said valve member can be moved to position to close said port independent of the position of said free end of said second bellows and the pressure on said second bellows.

27. For use in an oil well having an induction passage means and an eduction passage means both extending from the earth's surface to the producing formation, an intermitter bottom hole valve comprising a support, a first bellows secured to the support at one end of the bellows, a second bellows secured to the support at one end of the second bellows, a wall carried by said support, a gas port through said wall, a valve member adapted to close said port, means connecting said valve member to the free end of said first bellows, means to connect one end of said gas port to such an induction passage means as aforesaid, means to connect the other end of said gas port to such an eduction passage means as aforesaid, means to place the exterior of the first bellows in communication with said induction passage means, means to place the exterior of the second bellows in communicating with said eduction passage means, means placing the interiors of said two bellows in communication with each other and sealing them from outside fluids, gas at above atmospheric pressure inside said bellows, and means to limit the travel of said second bellows upon increase of pressure on the exterior thereof, said free end of the first bellows being free of any rigid connection to the free end of the second bellows, whereby said valve member can be moved to position to close said port independent of the position of said free end of said second bellows and the pressure on said second bellows.

28. The combination of claim 27 in which said valve member moves toward open position upon expansion of said first bellows and said limiting means limits compression of said second bellows.

29. The combination of claim 27 in which said valve member moves toward closed position upon expansion of said first bellows and there is means in communication with the space adjacent said exterior of the second bellows responsive to the presence of a predetermined head of oil in said space to produce a change in the net force on the free end of said second bellows to expand said second bellows.

30. The combination of claim 27 in which said valve member moves toward open position upon contraction of said first bellows and there is means including a buoyancy member responsive to the presence of a predetermined quantity of oil adjacent the buoyancy member to produce a change in the net force on the free end of said second bellows to expand said second bellows, and said limiting means limits the compression of said second bellows.

31. The combination of claim 30 in which said buoyancy member is a weight of a density greater than that of oil resting on the free end of said second bellows, the area of the bottom of said weight exposed to pressure in the space adjacent said second bellows being greater than the effective area of said second bellows exposed to pressure in said space.

32. The combination of claim 30 in which said buoyancy member is a body of lesser density than that of oil secured to the free end of said second bellows, the area of the bottom of said body exposed to pressure in the space adjacent said second bellows being greater than the effective area of said second bellows exposed to pressure in said space, and there is means including a spring normally compressing said second bellows to the limit allowed by said limiting means.

33. The combination of claim 27 in which said valve member moves toward open position upon contraction of said first bellows and there is means including a third bellows of larger cross-sectional area than said second bellows and containing gas under pressure acting normally to compress said second bellows and responsive to the presence of a predetermined head of oil in the space adjacent the exterior of said second bellows to produce a change in the net force acting on said second bellows to expand said second bellows.

34. The combination of claim 33 in which the free end of said third bellows normally merely presses against the free end of said second bellows and is free to separate therefrom entirely upon increase in pressure in the space adjacent the exterior of said second and third bellows sufficient to compress both said second and third bellows, said limiting means limiting compression of said second bellows upon further increase of the pressure on the exterior thereof.

35. The combination of claim 33 in which the free end of said third bellows is rigidly connected to the free end of said second bellows and said limiting means limits the expansion of said second bellows.

36. A bottom hole oil well intermitter valve assembly comprising a pipe section, a receiver secured inside said pipe section, said receiver being of generally cylindrical shape with an open top and an opening in the bottom thereof, a valve housing of generally cylindrical shape slidably received inside said receiver, a pair of axially spaced apart seal rings disposed inside said receiver between said receiver and said housing, said seal rings forming an annular chamber between said housing, receiver and rings, a port in said receiver communicating with said chamber, a port in said pipe section communicating with the exterior thereof, means connecting said ports for the passage of fluid therethrough, two walls in said valve housing forming a chamber therein, a port in said housing communicating at one end with said chamber in the housing and at the other end with said annular chamber, a port in each of said walls, means including a valve member adapted to close one of said wall ports to control fluid flow therethrough, said means also including a bellows in said housing chamber having one end sealed to the other of said walls around the port therein and the other end closed and connected to said valve member, said means also including a second bellows disposed on the other side of said wall and sealed at one end to said other wall around said port therein and having its other end closed, an opening through said housing above said chamber therein and said annular chamber, and an opening through said housing below said chamber therein and said annular chambers.

37. In combination with the assembly of claim 36, a third seal ring disposed inside of said receiver between said receiver and said housing and axially spaced from said pair of seal rings and outside of said annular chamber and forming a second annular chamber between the housing and receiver, one of the last two said openings in said housing communicating with said second annular chamber, a port in said receiver communicating at one end with said second annular chamber, a port in said pipe section communicating at one end with the exterior thereof, and means placing the other ends of the last two said ports in communication.

38. A bottom hole construction for an intermittent gas lift operated well comprising a casing, a concentric oil tubing, said tubing including an upper main portion and lower portions of larger diameter than the main portion forming a receiver and an accumulation chamber below the receiver; a wall across the top of said chamber portion, a pipe inside the chamber portion extending from a point near the bottom of the chamber portion up through said wall, valve means mounted in said receiver portion responsive to rise of oil in the tubing through said pipe to open said valve means and responsive to change in pressure in the annulus between said casing and tubing to close said valve means, means connecting the valve means to said annulus, and means connecting the valve means to the top of said chamber portion, said valve means controlling the flow of gas through the last two said means.

39. A bottom hole construction for an intermittent gas lift operated well comprising a casing, a concentric oil tubing, means including a pipe of larger diameter than the tubing and a wall across the top of the pipe forming an accumulation chamber, the bottom of the tubing being connected to the top of said accumulation chamber means, a smaller pipe inside the accumulation chamber means extending from a point near the bottom of the chamber means up through said wall, valve means including a liquid float responsive to the presence of oil in the tubing just above the accumulation chamber means to open and close said valve means, means providing communication between the annulus between said casing and tubing and the top of the accumulation chamber means, said valve means controlling fluid flow through the last said means, valve means mounted in said annulus and responsive to pressure in the annulus to open and close said valve means, second means providing communication between said annulus and the top of the accumulation chamber means, the last said valve means controlling fluid flow through the last said communication means.

40. A gas lift system for a well comprising means forming induction and eduction fluid passages from the earth's surface down to the producing formation, a source of gas under pressure, first means to provide communication between said source and the induction passage means adjacent the surface, second means to provide communication between said induction and eduction fluid passage means adjacent said formation, first valve means controlling fluid flow through said first communication means, second valve means controlling fluid flow through said second communication means, said second valve means comprising means responsive to the accumulation of a predetermined quantity of well fluid in the eduction passage means to initiate opening of said second valve means, said first valve means comprising surface means responsive to change in the condition of the gas in the induction passage means produced by opening of said second valve means to open said first valve means until a predetermined quantity of gas has been admitted to said induction passage means, said second valve means including means responsive to a predetermined change in pressure in said induction passage means to close said second valve means.

41. The combination of claim 40 in which said surface means includes means responsive to a pressure drop in said induction passage means to initiate opening of said first valve means.

42. The combination of claim 40 in which said surface means includes means responsive to an increase in the rate of flow of gas from said source to said induction passage means to initiate opening of said first valve means.

43. The combination of claim 41 in which said surface means includes means responsive to rise in pressure in said induction passage to initiate closure of said first valve means.

44. The combination of claim 41 in which said surface means includes clock means to initiate the closure of said first valve means a predetermined length of time after said first valve means has opened.

45. The combination of claim 40 in which said surface means includes means responsive to every other drop in pressure in said induction passage means below a first predetermined pressure to initiate opening of said first valve means and responsive to rise in pressure in said induction passage means above a second predetermined pressure higher than said first predetermined pressure to initiate closure of said first valve means, said change in pressure in said induction passage means to which responds said means for closing said second valve means being a drop in pressure below a third predetermined pressure lower than said first predetermined pressure.

46. The combination of claim 40 in which said surface means includes means responsive to a pressure drop in said induction passage means to initiate opening of said first valve means and means responsive to rise in pressure in said induction passage to initiate closure of said first valve means.

47. The combination of claim 40 in which said surface means includes means for actuating said first valve means, control means responsive to the rate of flow of gas from said source to said induction passage means above and below a predetermined rate to move to and from a position for activating said actuating means, control means responsive to the rise and fall of pressure of the gas in said induction passage above and below a predetermined pressure to move from and to a position for activating said actuating means, said actuating means responding to open said valve means only when both of said control means are in activating position and responding to close said valve means when either of said control means are out of activating position, and means active after each closure of said first valve means to prevent said pressure responsive control means from returning to activating position upon drop in pressure below said predetermined point until the rate of flow of gas from said source to said induction passage means has dropped below said predetermined point and caused said rate of flow responsive control means to move to deactivating position.

JOSEPH ZABA.

REFERENCES CITED

The following references are of record in the file of this patent:

UNITED STATES PATENTS

| Number | Name | Date |
|--------|------|------|
| 2,006,909 | Boynton | July 2, 1935 |
| 2,082,325 | Cross | June 1, 1937 |
| 2,132,738 | Knox | Oct. 11, 1938 |
| 2,142,483 | Crites | Jan. 3, 1939 |
| 2,317,121 | Thomas | Apr. 20, 1943 |
| 2,339,487 | King | Jan. 18, 1944 |
| 2,361,718 | Taylor | Oct. 31, 1944 |
| 2,368,999 | O'Leary | Feb. 6, 1945 |